(12) United States Patent
Jakobsen et al.

(10) Patent No.: US 12,034,369 B2
(45) Date of Patent: Jul. 9, 2024

(54) POWER SUPPLY CIRCUIT, LOAD CIRCUIT, ELECTRONIC CIRCUIT, METHOD FOR SUPPLYING POWER AND METHOD FOR OPERATING AN ELECTRONIC CIRCUIT

(71) Applicant: Infineon Technologies AG, Neubiberg (DE)

(72) Inventors: Lars Toennes Jakobsen, Munich (DE); Ljudmil Anastasov, Munich (DE)

(73) Assignee: Infineon Technologies AG, Neubiberg (DE)

( * ) Notice: Subject to any disclaimer, the term of this patent is extended or adjusted under 35 U.S.C. 154(b) by 264 days.

(21) Appl. No.: 17/404,263

(22) Filed: Aug. 17, 2021

(65) Prior Publication Data

US 2022/0060111 A1 Feb. 24, 2022

(30) Foreign Application Priority Data

Aug. 24, 2020 (DE) .......................... 102020210714.9

(51) Int. Cl.
 *H02M 3/158* (2006.01)
 *H02M 1/088* (2006.01)

(52) U.S. Cl.
 CPC ........... *H02M 3/158* (2013.01); *H02M 1/088* (2013.01)

(58) Field of Classification Search
 CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025;

(Continued)

(56) References Cited

U.S. PATENT DOCUMENTS 5,892,389 A * 4/1999 Lai .................. H01H 47/325
 327/543
7,714,555 B2 * 5/2010 Lee .................. H02M 1/32
 323/282

(Continued)

*Primary Examiner* — Jeffrey A Gblende
(74) *Attorney, Agent, or Firm* — Harrity & Harrity, LLP

(57) ABSTRACT

A power supply circuit includes: an output terminal for supplying power for a semiconductor device at the terminal; a control circuit configured to control a power level of the supplied power based on a control signal; and an input for receiving one or more timing signals, wherein the power supply circuit is configured to derive an indication for a scheduled change of a load current of the supplied power using the one or more timing signals. The power supply circuit is configured to adapt the control signal based on the indication for the scheduled change of the load current.

20 Claims, 17 Drawing Sheets

(58) Field of Classification Search
CPC ... H02M 1/0045; H05B 39/048; B23K 11/24; H04B 2215/069
See application file for complete search history.

(56) References Cited

U.S. PATENT DOCUMENTS

| | | | | |
|---|---|---|---|---|
| 7,787,222 | B2* | 8/2010 | Covi | H02M 1/32 |
| | | | | 361/18 |
| 8,044,644 | B2* | 10/2011 | Huang | H02M 3/1588 |
| | | | | 323/283 |
| 8,085,021 | B2* | 12/2011 | Chen | H02M 1/4225 |
| | | | | 323/283 |
| 11,196,343 | B2* | 12/2021 | Fukushima | H02M 1/08 |
| 2009/0146629 | A1* | 6/2009 | Kim | H02M 3/156 |
| | | | | 323/282 |
| 2013/0320957 | A1 | 12/2013 | Adamo et al. | |
| 2014/0320093 | A1 | 10/2014 | Zhao et al. | |
| 2018/0138812 | A1 | 5/2018 | Rose et al. | |

* cited by examiner

POWER SUPPLY CIRCUIT, LOAD CIRCUIT, ELECTRONIC CIRCUIT, METHOD FOR SUPPLYING POWER AND METHOD FOR OPERATING AN ELECTRONIC CIRCUIT

RELATED APPLICATION

This application claims priority to German Patent Application No. 102020210714.9 filed on Aug. 24, 2020, which is incorporated herein by reference in its entirety.

FIELD

Examples of the present disclosure relate to power supply circuits, load circuits and electronic circuits, for example semiconductor circuits, comprising a power supply circuit and a load circuit. In particular, examples of the present disclosure relate to a power supply circuit for a semiconductor device. Further examples relate to a method for supplying power to a semiconductor device and a method for operating an electronic circuit. Examples relate to a management of deterministic load current steps. Some examples refer to a reduction of output voltage deviation in switch mode regulators during deterministic load steps. Some examples refer to a radar system.

BACKGROUND

Power supply circuits are used to supply power to load circuit, for example a semiconductor device, which is connected to the power supply circuit. Commonly, power supply circuits for semiconductor devices regulate a current or voltage supplied to the load circuit so that the current on the voltage corresponds to a desired value which is specific to the load circuit. Usually, the voltage or the current supplied to the load circuit is measured, and the measured value is used for regulating the current or the voltage, respectively, supplied to the load circuit. However, at the time instant of a change of the load, for example a load step, this kind of feedback leads to a deviation of the supplied current or voltage from the desired value. The extent of this deviation usually depends on the speed of the feedback.

Some circuits are sensitive to noise on the supply voltage provided by a voltage regulator. One source of noise is the output voltage deviation occurring when the load current of the circuit changes abruptly (load step). The root cause for the slow response to a load step in a Peak Current Mode Controlled (PCMC) switch mode regulator is the response time of the error amplifier.

It would be desirable to have a concept that provides for a small or even negligible deviation of a supplied current or supplied voltage from a desired value in the case of a change of the load.

SUMMARY

Examples of the present disclosure are based on the finding, that in the case that load circuits, which may be active semiconductor devices such as a bipolar, BiCMOS or CMOS devices, follow a scheduled operation, a chronological sequence of their power consumption, for example a consumption of a current supplied to such a load circuit or semiconductor device, may be deterministic. The knowledge about the chronological sequence of the power consumption may be used to control the power, for example the current or the voltage, supplied to the load circuit by a power supply circuit. In some examples, the load circuit is a radar MMIC repeatedly transmitting FMCW chirps in a deterministic manner.

Examples of the present disclosure provide a power supply circuit including: an output terminal for supplying power for a semiconductor device at the terminal; a control circuit configured to control a power level of the supplied power based on a control signal; and an input for receiving one or more timing signals, wherein the power supply circuit is configured to derive an indication for a scheduled change of a load current of the supplied power using the one or more timing signals. The power supply circuit is configured to adapt the control signal based on the indication for the scheduled change of the load current.

Further examples of the present disclosure provide a load circuit, including: a power input terminal for receiving a supply power; and one or more signal output terminals. The load circuit is configured to provide one or more timing signals at the one or more signal output terminals, the timing signals indicating a scheduled power consumption of the supply power.

Further examples of the present disclosure provide an electronic circuit, including a load circuit; a power supply circuit connected to the load circuit for supplying power to the load circuit, wherein the power supply circuit includes a control circuit configured to control a power level of the supplied power based on a control signal. The power supply circuit and the load circuit are connected via one or more signal paths for one or more timing signals. The power supply circuit is configured to derive an indication for a scheduled change of power consumption of the supplied power using the one or more timing signals, and the power supply circuit is configured to adapt the control signal based on the indication for the scheduled change of power consumption.

Further examples of the present disclosure provide a method for supplying power to a semiconductor device, including: controlling a power level of the supplied power by using a control signal; deriving an indication for a scheduled change of a load current of the supplied power using one or more timing signals; and adapting the control signal based on the indication for the scheduled change of the load current.

Further examples of the present disclosure provide a method for operating an electronic circuit, including: supplying power to a load circuit of the electronic circuit; controlling a power level of the supplied power by using a control signal; adapting the control signal based on a scheduled power consumption of the load circuit.

Thus, examples of the present disclosure exploit a knowledge about a scheduled change of power consumption of the load circuit, e.g. the semiconductor device, or a scheduled change of a load current supplied to the load circuit for adapting the power or the current supplied to the load circuit. Using the knowledge about the scheduled change of power consumption enables an adaption of the current or the voltage supplied to the load circuit at the time instant of the scheduled change of power consumption. In contrast to purely controlling the current or the voltage supplied to the load circuit in reaction to a change of power consumption, the disclosed concept may therefore provide for a small or even a negligible deviation of the current or the voltage supply to the load circuit from a desired or predetermined value at the time instant of the change of power consumption. The power supply circuit being configured for receiving a timing signal, and/or the load circuit being configured for providing the timing signal allows for a fast signaling of a timing information, so that the indication for the scheduled change of the power consumption or the load current may be very accurate, i.e. the time instant in time at which the scheduled change of the power consumption or the load current is scheduled to occur may be derived very accurately by the power supply circuit.

BRIEF DESCRIPTION OF THE DRAWINGS

Advantageous implementations of the present disclosure are the subject of dependent claims and examples are described in more detail below with respect to the figures, among which:

DETAILED DESCRIPTION

In the following, embodiments are discussed in detail, however, it should be appreciated that the embodiments provide many applicable concepts that can be embodied in a wide variety of supplying power to a load circuit. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Figure 1:
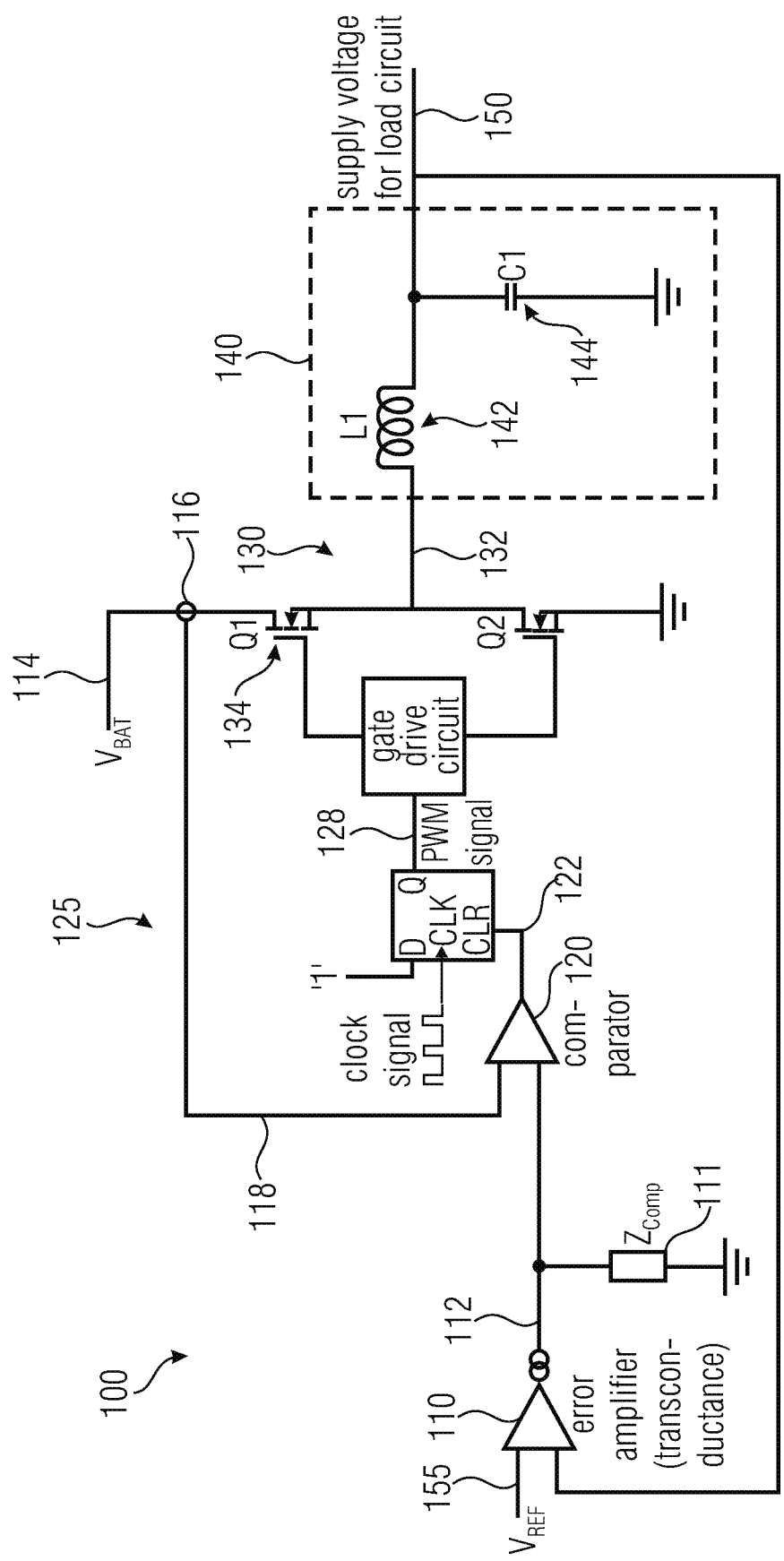
FIG. 1 shows a circuit diagram of a conventional PCMC buck regulator.

FIG. 1 shows a circuit diagram of a conventional PCMC buck regulator 100. The buck regulator 100 provides a supply voltage for a load circuit at an output terminal 150 of the buck regulator 100. The buck regulator 100 comprises a control loop 125 for regulating the supply voltage so that the supply voltage corresponds to a reference voltage provided to an error amplifier 110 of the buck regulator at a reference voltage terminal 155. The reference voltage may have a predetermined value which usually depends on requirements of the load circuit. The buck regulator 100 further comprises an output stage 130 to provide a current had an output 132 of the output stage. The output stage 130 is supplied with current by a current source 114. The output stage 130 is controlled by a modulation signal 128 which is generated based on an output signal 122 of a comparator 120.

The buck regulator 100 further comprises a low pass filter 140 which is arranged between the output 132 of the output stage 130 and the output terminal 150. The low pass filter 140 may be implemented as an inductance 142 and a capacitance 144 which are chosen so that the low pass filter 140 filters high frequency components of the output of the output stage, for example frequency components with a frequency similar to a frequency of the modulation signal 128.

The control loop 125 consists of a current sense element 116 sensing the current in a high-side (HS)-MOSFET 134 of the output stage 130, the comparator 120 comparing the measured current 118 to a signal 112 provided by an error amplifier 110.

The error amplifier 110 processes the difference between the output voltage 150 of the buck regulator 100 and a reference voltage 155. The system response to a change in load current (load step) is determined by the bandwidth of the error amplifier 110 and the compensation network ($Z_{comp}$) 111. The error amplifier 110 will only respond when the output voltage 150 on C1 starts to deviate from the reference voltage 155. For example, the output voltage 150 deviation for a specific load step may be up to 3-5% of the nominal reference voltage 155.

Figure 2:
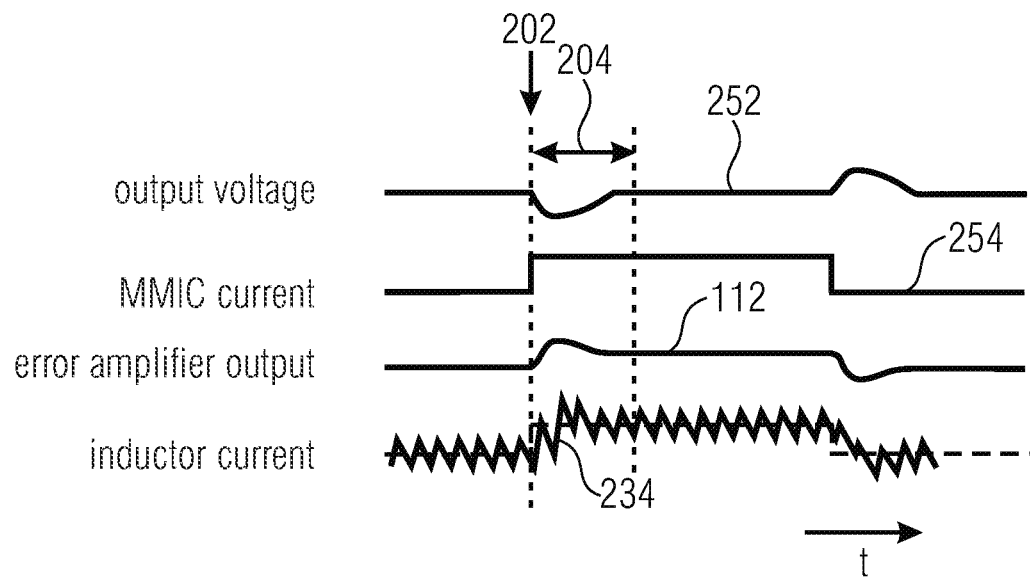
FIG. 2 shows a temporal dependency of signals of a conventional PCMC buck regulator.

FIG. 2 shows examples of a temporal dependency of a supply voltage or output voltage 252 and a supplied current or load current 254 at the output terminal 150 of the buck regulator 100. FIG. 2 further shows the output signal 112 of the error amplifier 110 and an output current 234 at the output 132 of the output stage 130. As a result of a load step 202 of the load current 254, the output voltage 252 changes and deviates from the reference voltage, resulting in a reaction of the error amplifier output signal 112. Based on the error amplifier output signal 112, the control loop 125 regulates the current provided at the output terminal 150 so that after a reaction time 204 and the output voltage 252 corresponds to the reference voltage as before the load step 202.

In other words, the reaction time of the buck regulator 100 causes a large output voltage deviation and a long settling time. As visible from the output current 234, there is a delay before the inductor current 234 starts to rise and additionally there is an inductor current overshoot.

Figure 3:
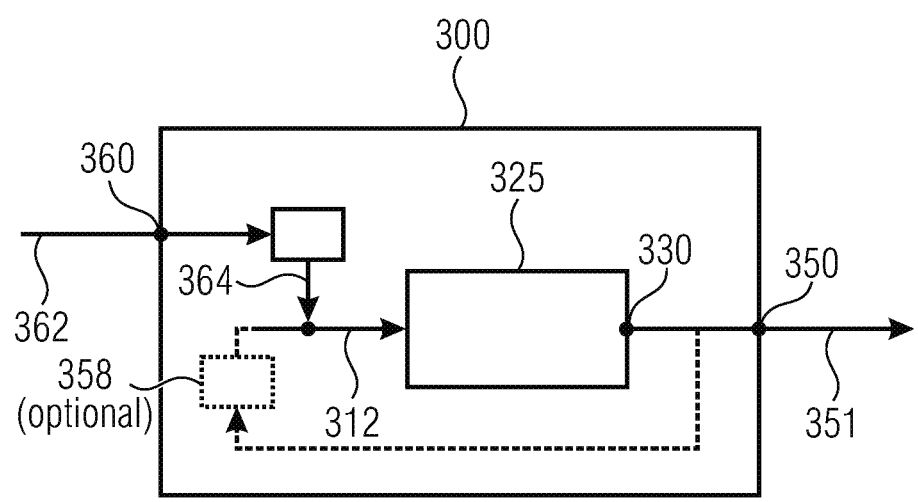
FIG. 3 shows a schematic representation of an example of a power supply circuit according to the present disclosure.

FIG. 3 shows a schematic representation of a power supply circuit 300 according to an example of the present disclosure. The power supply circuit 300 comprises an output terminal 350 for supplying power 351 for a semiconductor device at the output terminal 350. The power supply circuit 300 further comprises a control circuit 325 configured to control a power level of the supplied power 351 based on a control signal 312, and an input 360 for receiving one or more timing signals 362, wherein the power supply circuit is configured to derive an indication 364 for a scheduled change of a load current of the supplied power 351 using the one or more timing signals 362. The power supply circuit is configured to adapt the control signal 312 based on the indication 364 for the scheduled change of the load current.

For example, the supplied power 351 is defined by a supply voltage and the load current at the output terminal 350. For example, the control circuit 325 controls the supplied power 351 based on an actual power consumption at the output terminal 350, for example by controlling a load current at the output terminal 350, for example, so that a supply voltage of the supplied power, i.e. a supply voltage at the output terminal 350 is kept essentially constant.

For example, the control signal 312 may depend on the supplied power 351, for example on the supply voltage or the load current at the output terminal 350. The power supply circuit 300 may be configured to derive the control signal 312 from the supply voltage or the load current at the output terminal 350.

For example, the power supply circuit is configured to compare the supply voltage of the load current at the output terminal 350 to a predetermined (or reference) value to which the supply voltage or the load current, respectively, is desired to correspond to. The power supply circuit is further configured to provide the control signal 312 so that the control signal 312 indicates a deviation of the supply voltage or the load current, respectively, from the predetermined value.

For example, the power supply circuit 300 derives the indication 364 from information transmitted in one or more of the timing signals 362. The indication 364 for the scheduled change of the load current may comprise an information about a magnitude of the scheduled change of the load current.

In other words, examples of the present disclosure exploit the finding, that in a deterministic system the timing and amplitude of load steps may be known by the load circuit or a controlling element, e.g. a microcontroller. The load circuit or the controlling element may thus provide a signal to the power supply circuit, which may be a switch mode regulator, to signal that the load current will change. This information can be used to provide a feed-forward control for the output current of the power supply circuit or switch mode regulator.

By deriving the indication 364, the power supply circuit 300 is capable of adapting the control signal 312 at the time instant at which the scheduled change of the load current occurs. In other words, the power supply circuit 300 may be capable of anticipating the scheduled change of the load current, and adapt the control signal 312 accordingly. For example, the power supply circuit may be capable of adapting the supply power 351 at the time instant or before the time instant for which the change of the load current is scheduled so that a deviation of the supply voltage from the predetermined value may be kept small.

Accordingly, the power supply circuit 300 may be configured to infer from the one or more timing signals 362, the upcoming scheduled change of the load current.

For example, subsequently to inferring that the scheduled change of the load current is upcoming, the power supply circuit 300 may adapt the control signal 312 based on the indication 364.

According to examples, the power supply circuit 300 comprises an error amplifier 358 configured to provide the control signal 312 in dependence on a deviation of a supply voltage of the supplied power 351, i.e., for example, a supply voltage at the output terminal 350, from a predetermined supply voltage value.

By considering the deviation of the supply voltage from the predetermined supply voltage value, the power supply circuit 300 is capable of reacting on a change of the load current. For example, the power supply circuit 300 may change the magnitude of the provided load current so that the supply voltage at the output terminal 350 corresponds to the predetermined supply voltage value. Thus, the control signal 312, based on which the power supply circuit 300 controls the supply power 351 may depend on the supply power 351 and on the indication 364. Consequently, the power supply circuit 300 may be capable of reacting on a change of the load current at the output terminal 350 and maybe A bill of anticipating a change of the load current of the output terminal 350. This combination allows for a very accurate control of the supply voltage and/or the load current at the output terminal 350.

Figure 4:
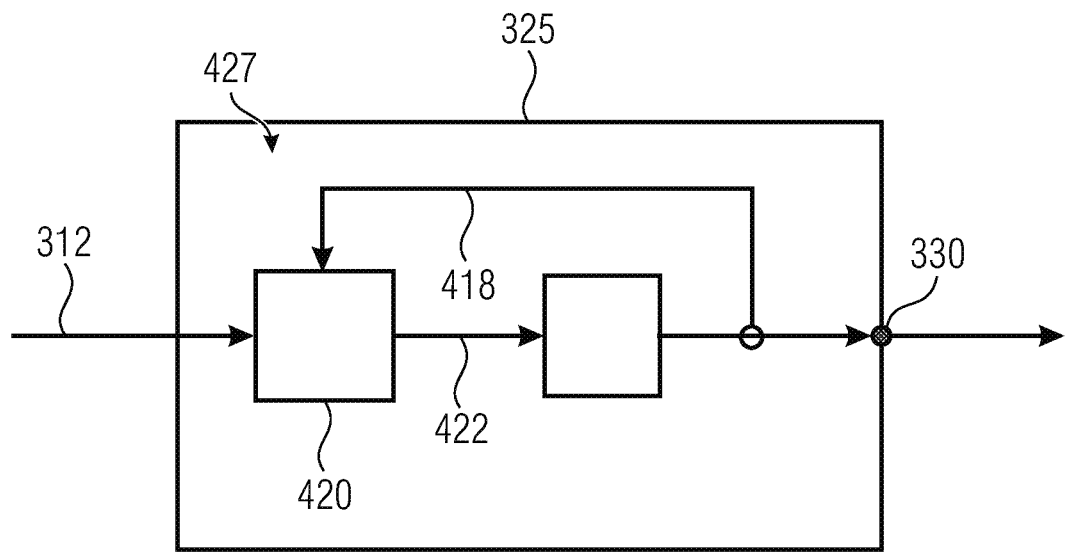
FIG. 4 illustrates an example of the control circuit according to the present disclosure.

FIG. 4 illustrates an example of the control circuit 325, as it may be implemented in the power supply circuit 300. According to examples, the control circuit 325 comprises a feedback loop 427 configured to control the power level of the supplied power 351 based on the control signal 312, wherein the control signal 312 depends on the supplied power 351.

According to examples, the control circuit 325 is configured to obtain a current feedback signal 418 indicating a magnitude of the load current at the output terminal 350, wherein the control circuit comprises a comparator 420 configured to compare the control signal 312 to the current feedback signal 418 to generate a modulation signal based on an output signal 422 of the comparator 420, and wherein the control circuit 325 is configured to control the magnitude of the load current at the output terminal 350 using the modulation signal.

Figure 5:
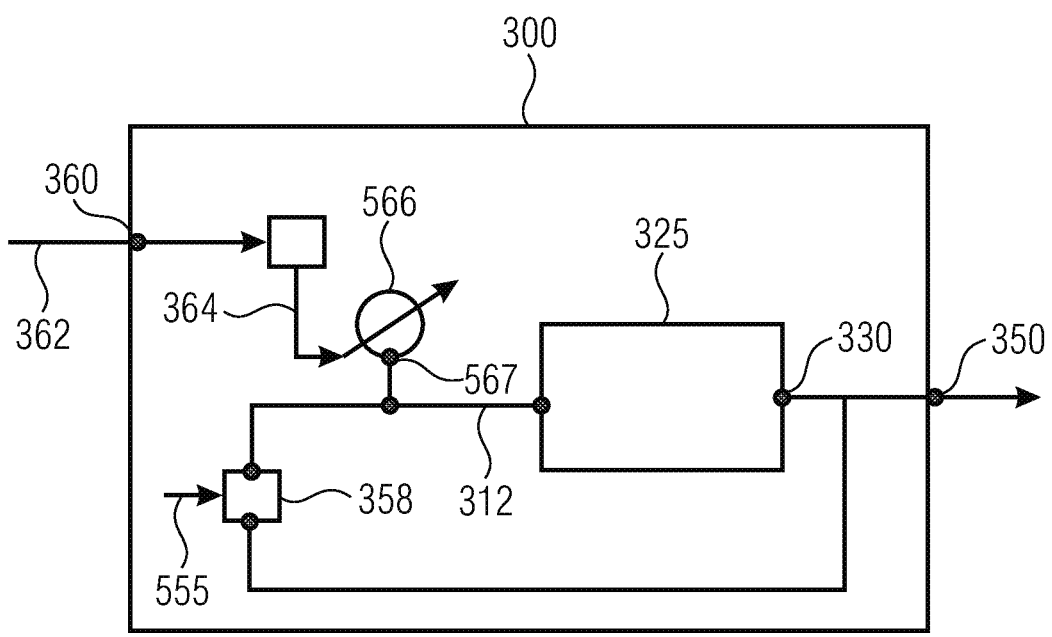
FIG. 5 illustrates another example of the power supply circuit according to the present disclosure.

FIG. 5 illustrates another example of the power supply circuit 300. According to examples, the control signal 312 is a current signal, and the power supply circuit 300 further comprises a controlled current source 566, an output 567 of which is connected to a signal path of the control signal 312, wherein the power supply circuit 300 is configured to adapt the control signal 312 by controlling an output current of the controlled current source 566, for example by using the indication 364.

Figure 6:
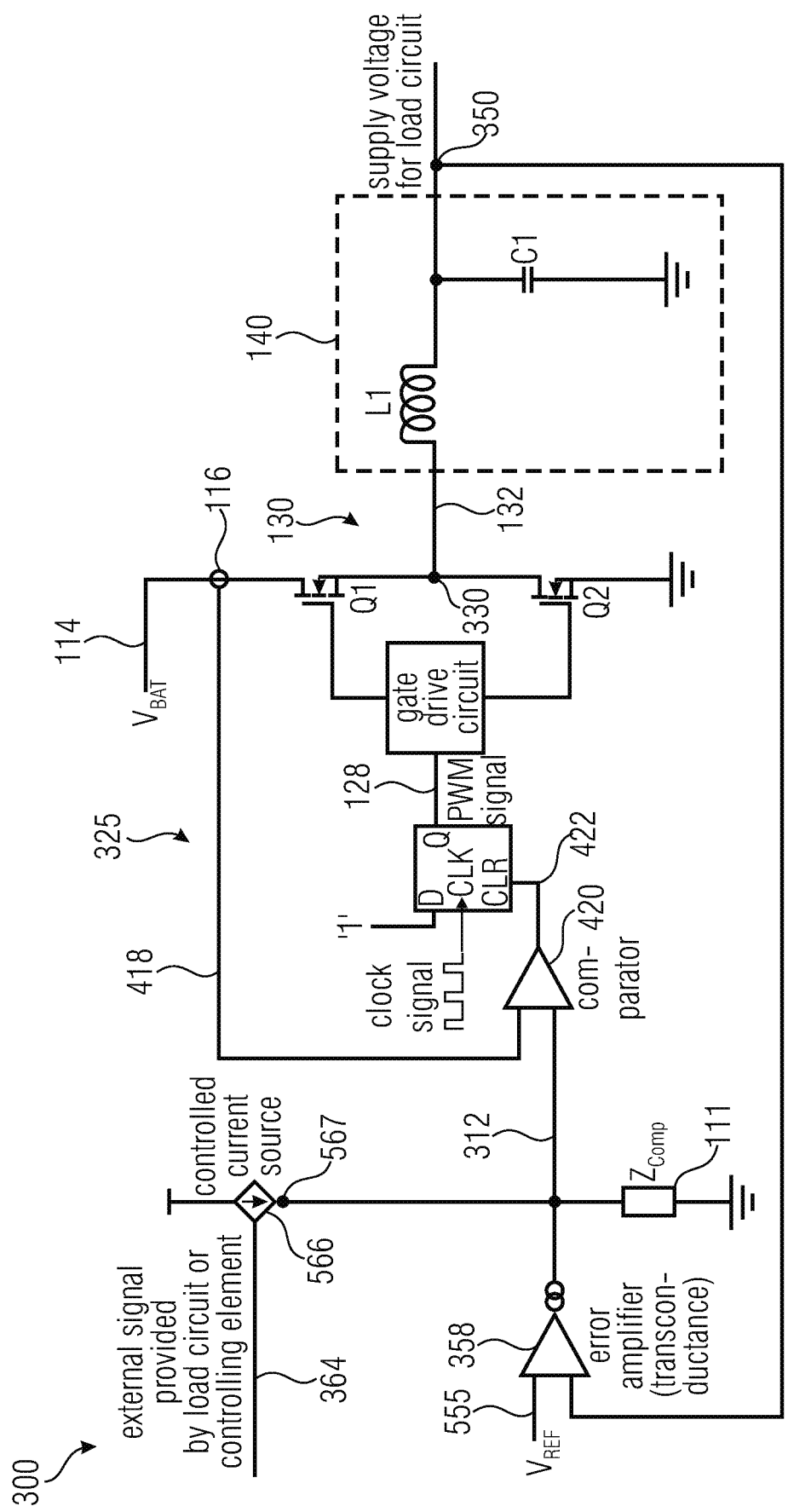
FIG. 6 illustrates another example of the power supply circuit according to the present disclosure.

FIG. 6 illustrates another example of the power supply circuit 300, which may correspond to a PCMC buck regulator with load current feed forward. Parts of the shown example may be implemented similar to the buck regulator 100 shown in FIG. 1 and the corresponding description may apply equivalently. The control circuit 325 may comprise a comparator 420 which provides an output signal 422 and the output stage 130 as described with respect to the buck regulator 100. The control circuit 325 may generate the modulation signal 128 from the output signal 422 of the comparator 420 and may use the modulation signal 128 to control the output stage 130. The output stage 130 may provide the output 330 of the control circuit 325. A current measurement 116 of the load current at the output 330 of the control circuit 325 may provide the feedback current signal 418 which is input to the comparator 420. The comparator 420 may compare the feedback current signal 418 to the control signal 312. The error amplifier 358 may provide the control signal 312 by comparing the load current at the output terminal 352 to the predetermined supply voltage value provided at the reference voltage terminal 555 of the error amplifier 358. An output 567 of the controlled current source 566 is connected to an input for the control signal 312 of the comparator of 420, such that a current of the control signal 312 comprises current contributions provided by the error amplifier 358 and the controlled current source 567. The controlled current source 566 is controlled by using the indication 364.

Figure 7:
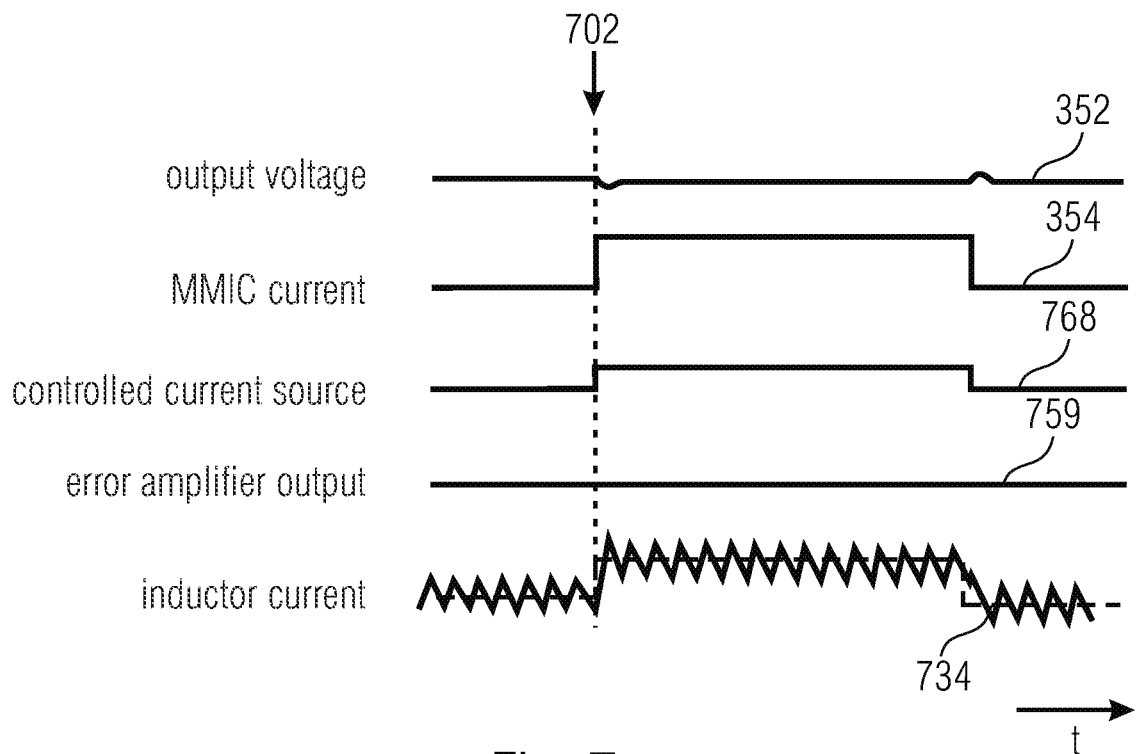
FIG. 7 shows an example of a temporal behavior of the power supply circuit at load current steps.

FIG. 7 shows examples of a temporal dependency of the supply voltage or output voltage 352 and the load current 354 at the output terminal 350 of the power supply circuit 300. FIG. 7 further shows the current contribution 759 of the error amplifier 358 to the control signal 312 and a current contribution 768 of the controlled current source 566 to the control signal 312. At the time instant 702 of a load current step, the controlled current source adapts its current contribution 768, resulting in a change of the load current 354. Therefore, a deviation of the supply voltage 352 from the predetermined supply voltage value is small. In other words, the supply voltage 352 may have a minimum voltage deviation and a short settling time. The inductor current 734 may start to rise almost immediately and there may be virtually no inductor current overshoot.

For example, the current contribution 768 provided to the output of the error amplifier 358, which is provided to the control signal 312, is proportional to the scheduled load current at the output terminal 350. Thus, the output voltage deviation in response to the load step may be reduced significantly.

The current 768 provided by the controlled current source 566 allows the error amplifier to maintain the output signal without significant changes. The inductor current 734 will immediately increase in response to the signal 362 provided by the load circuit and controlling element 566. As a result, the output voltage deviation is significantly reduced. The external signal 362 provided to the switch mode regulator can be a simple logic signal or through a serial bus, e.g. SPI, I2C etc.

FIG. 7 further shows the current at the output 330 of the control circuit 325. The low pass filter 140 may filter the high frequency contribution of the current at the output 330.

Figure 8:
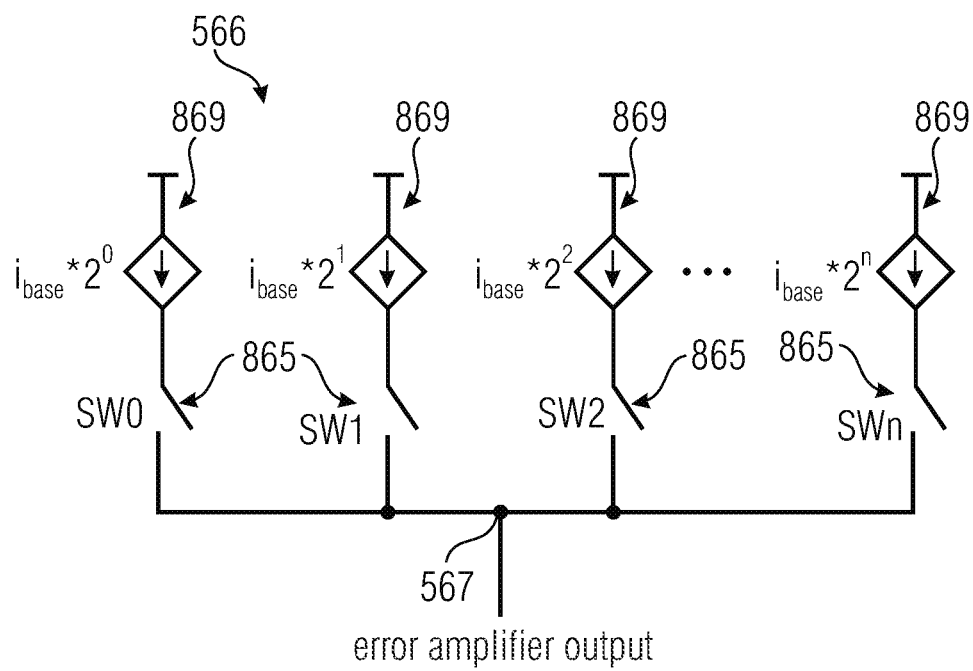
FIG. 8 illustrates an example of the controlled current source according to the present disclosure.

FIG. 8 illustrates an example of the controlled current source 566 implemented in the power supply circuit 300. The controlled current source 566 may comprise one or more current sources 869. Each of the current sources 869 may be switched to the output 567 of the controlled current source 566 by a respective switch 865. Each of the current sources 869 may provide the same amount of current or the current sources 869 may provide different amounts of current. For example, a binary weighting can be used to give additional granularity. As an example, the number of parallel current sources may be 8. The control signal for the controlled current source output could be an 8-bit SPI command to provide 256 steps to set the load current feed forward signal and thereby the current contribution 768 to the control signal 312. In other words, the controlled current providing the output current feed forward signal can consist of a number of current sources to enable the control of the amplitude of the output current change.

Figure 9:
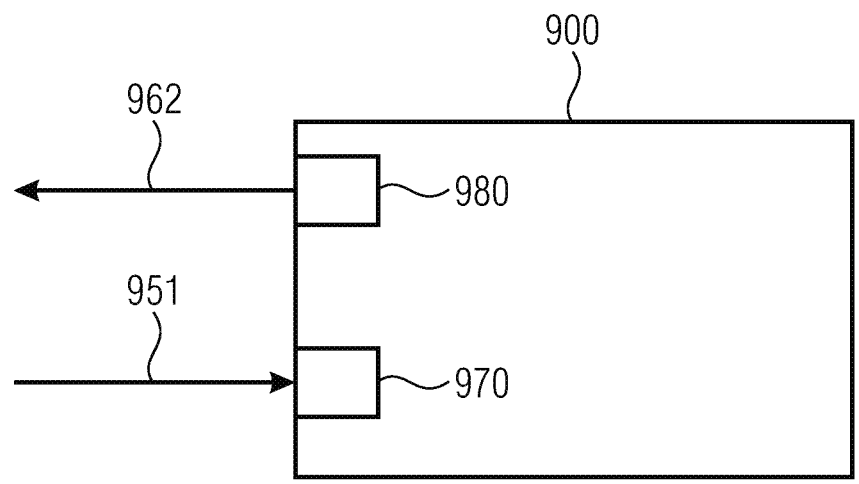
FIG. 9 illustrates an example of a load circuit according to the present disclosure.

FIG. 9 illustrates a load circuit 900 according to an example of the present disclosure. The load circuit 900 comprises a power input terminal 970 for receiving a supply power 951, and one or more signal output terminals 980. The load circuit is configured to provide one or more timing signals 962 at the one or more signal output terminals 980, the timing signals 962 indicating a scheduled change of power consumption of the supply power 951.

For example, one or more of the timing signals 962 may correspond to one or more of the timing signals 362.

For example, the supply power 951 may be defined by a load current and a supply voltage at the power input terminal 970. For example, the scheduled change of power consumption may be indicated as a scheduled change of the load current at the power input terminal 970 or as a scheduled change of the voltage at the power input terminal 970.

Accordingly, the one or more timing signals 962 may indicate the scheduled change of power consumption by indicating a scheduled change of a load current of the supply power 951 consumed by the load circuit 900.

Figure 10:
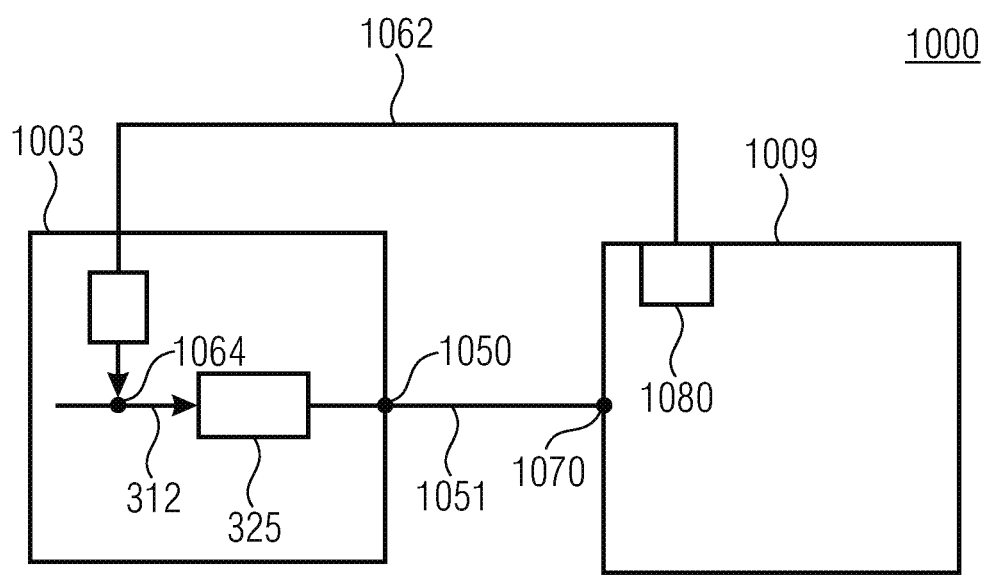
FIG. 10 illustrates an example of an electronic circuit according to the present disclosure.

FIG. 10 illustrates an example of an electronic circuit 1000 according to the present disclosure. The electronic circuit 1000 comprises a load circuit 1009, and a power supply circuit 1003 connected to the load circuit 1009 for supplying power to the load circuit 1009. The connection may be a direct current connection with no active control elements between the power supply circuit 1003 and the load circuit 1009. The power supply circuit 1003 comprises a control circuit 325 configured to control a power level of the supplied power based on a control signal 312. The power supply circuit 1003 and the load circuit 1009 are connected via one or more signal paths for one or more timing signals 1062. The power supply circuit is configured to derive an indication 1064 for a scheduled change of power consumption of the supplied power 1051 using the one or more timing signals 1062. The power supply circuit 1003 is configured to adapt the control signal 312 based on the indication 1064 for the scheduled change of power consumption.

For example, the supply power 1051 may be defined by a load current between the power supply circuit 1003 and the load circuit 1009 and a supply voltage at an output terminal 1050 of the power supply circuit 1003 or at a power input terminal 1070 of the load circuit 1009. For example, the scheduled change of power consumption may be indicated as a scheduled change of the load current or as a scheduled change of the voltage at the power input terminal 1070.

The electronic circuit 1000 may be an integrated circuit, for example a semiconductor integrated circuit.

According to examples, the control circuit 325 is configured to control the power level of the supplied power 1051 by controlling a load current of the supplied power, and the power supply circuit 1003 is configured to derive the indication 1064 for the scheduled change of power consumption by deriving an indication 364 for a scheduled change of the load current using the one or more timing signals 1062, for example implying that a supply voltage of the supplied power is to be kept essentially constant.

For example, the power supply circuit 1003 may correspond to the power supply circuit 300, and accordingly the output terminal 1050 may correspond to the output terminal 350. Furthermore, the indication 1064 may correspond to the indication 364 and the supplied power 1051 to the supplied power 351 and/or the supplied power 951.

The load circuit 1009 may correspond to the load circuit 900, and accordingly, the power input terminal 1070 to the power input terminal 970, and the signal output terminals 1080 to the signal output terminals 980.

The timing signals 1062 may correspond to the timing signals 362 and/or the timing signals 962.

In the following, different examples for the timing signals 1062 are described in the context of the electronic circuit 1000 with the power supply circuit 1003 and the load circuit 1009. The examples may be implemented in the power supply circuit 300 and the load circuit 900. Accordingly, the description may apply to the timing signals 362 and 962. In a same manner, the herein disclosed generating of the indication 1064 derived from the timing signals 1062 can be also applied to the generating of the indication 364. It should be noted, that the scheduled change of power consumption may correspond to or may be interpreted as a scheduled change of the load current with respect to the power supply circuit 300 or the indication 364.

Further, it should be noted, that features described herein with respect to the power supply circuit 300 may equivalently be implemented in the power supply circuit of 1003 of the electronic circuit. Features of the power supply circuit 300 related to the scheduled change of the load current, e.g. the indication 364 and the timing signals 362, may be implemented in the power supply circuit 1003 in terms of the scheduled change of power consumption. These features are not limited to a change of the load current as described in the specific implementation of the power supply circuit 1003.

According to examples, the load circuit 1009 is configured to provide, in anticipation of a scheduled change of operation of the load circuit at an upcoming instant of time, as one of the timing signals 1062, an information about a magnitude of the scheduled change of power consumption of the supplied power 1051, for example an information about a magnitude of a scheduled change of the load current, attributed to (associated with) the scheduled change of operation, and the power supply circuit 1003 is configured to receive the information about the magnitude of the scheduled change of power consumption, and adapt the control signal based on and as indicated by the magnitude of the scheduled change of power consumption.

For example, one of the timing signals 1062 may be a serial signal and the information about the magnitude of the scheduled change of power consumption may be a serial interface message, for example an SPI interface message.

For example, the serial interface message may have 8 bit at rate of 16 Mbit/s. Thus, a transmission time may be approximately 0.5 µs per message, which may be fast enough when the load circuit 1009 comprises a radar system or a radar transceiver (cf. description of FIG. 19) and the load change is effected by a scheduled radar operation such as transmitting one or more FMCW chirps or processing data. An 8-bit message allows notification of 256 different load current steps.

For example, the load circuit 1009 provides the serial interface message, before a scheduled change of power consumption which is upcoming and indicates within the serial interface message the magnitude of the upcoming scheduled change of power consumption. In some examples the message may be provided immediately before the scheduled change of power consumption. Upon receipt of the serial interface message comprising the information about the magnitude of the scheduled change of power consumption, the power supply circuit 1003 may derive, as the indication 1064, from the information about the magnitude of the scheduled change of power consumption that a change of power consumption having the indicated magnitude is upcoming and adapt the control signal 312 based on the indication 1064.

For example, the information about the magnitude of the scheduled change of power consumption may indicate a relative change of the power consumption, i.e. relative to a current power consumption, or may indicate an absolute power consumption at the upcoming time instant, so that the power supply circuit may infer the indication 1064 based on the information about the magnitude of the scheduled power consumption and a current power consumption.

Similarly, according to examples, at least one of the timing signals 362, 1062 comprises an information about a magnitude of a scheduled change of the load current at an upcoming instant of time. In reaction to receiving the information about the magnitude of the scheduled change of the load current, the power supply 300 circuit is configured to adapt the control signal, for example so as to adapt the load current, based on the magnitude of the scheduled change of the load current.

Similarly, according to examples, the load circuit 900 is configured to provide, in anticipation of a scheduled change of operation of the load circuit at an upcoming instant of time an information about a magnitude of the scheduled change of power consumption as one of the timing signals 962, for example a scheduled change of the load current, of the supply power attributed to (or associated with) the scheduled change of operation.

A serial interface message may provide an accurate information about the magnitude of the scheduled change of power consumption and provides for a flexible way to provide the information about the magnitude to the power supply circuit. For example, a serial interface message allows indicating the magnitude of the scheduled change of power consumption individually for each change of power consumption. A bandwidth of the serial interface may be adapted to the requirements of the application, for example according to a range of possible magnitudes and a desired transmission rate.

For example, SPI notifications require a serial communication module. Accordingly, the power supply circuit 1003 and the load circuit 1009 may comprise serial communication modules. For example, the load circuit may comprise one or more SPI masters. As an example, a SPI serial interface can notify many different load-steps, for example an 8-bit SPI message may transmit 256 notifications for 256 load steps.

It should be noted, that although SPI messages were used as an example of serial messages, any serial interface can be used, like SPI, I2C, RS232.

According to examples, the load circuit 1009 is configured to provide in anticipation of a scheduled change of operation of the load circuit at an upcoming instant of time a trigger signal indicating that the scheduled change of operation is upcoming as one of the timing signals. The trigger signal is specific to a type of the scheduled change of operation. The power supply circuit 1003 is configured to adapt the control signal by a predetermined magnitude which is attributed to the trigger signal (or attributed to the type of the scheduled change of operation indicated by the trigger signal) in reaction to receiving the trigger signal.

Similarly, according to examples, at least one of the timing signals comprises a trigger signal indicating that a scheduled change of the load current is upcoming and the power supply circuit 300 is configured to adapt the control signal 312 by a predetermined magnitude which is attributed to the trigger signal in reaction to receiving the trigger signal.

Similarly, according to examples, the load circuit 900 is configured to provide, in anticipation of a scheduled change of operation of the load circuit at an upcoming instant of time a trigger signal as one of the timing signals 962. The trigger signal indicates that the scheduled change of operation is upcoming and is specific to a type of the scheduled change of operation.

The trigger signal may be implemented as a digital signal, for example a 0/1 signal. The power supply circuit 1003 may associate one or each of a falling edge and a rising edge of the trigger signal with a specific type of scheduled change of power consumption. The power supply circuit 1003 may have stored or may be provided with the predetermined magnitude associated with the respective specific type of scheduled change of power consumption.

A digital line can notify one load current step, for example a critical one, with one size of the step. A rising edge may notify positive load-steps, for example +0.4 A and a falling edge notifies negative load-steps, for example −0.4 A.

Further load current steps, for example all other load current steps, are controlled by the default behavior of the DC/DC controller, e.g. by the default behavior of the control circuit 325 or the power supply circuit 300. Controlling may be based on a reaction of the error amplifier 358 on a change of the load current at the output terminal 350. These further load current steps may not be critical and may therefore not be notified.

In one example, a digital line can transmit two notifications, for example two different types of scheduled changes of power consumption. Accordingly, two digital lines may transmit four notifications.

A trigger signal is comparably easy to implement and may be a fast possibility to indicate the scheduled change of power consumption. As the information about the magnitude of the scheduled change of power consumption may already be available to the power supply circuit, the trigger signal may only indicate that the scheduled change of power consumption is upcoming. Thus, less information is transmitted, allowing the trigger signal to be transmitted by a digital line. Thus, the indication for the scheduled change of power consumption may be transmitted by a single falling or rising edge, which allows a fast indication of the scheduled change of power consumption.

According to examples, one of the timing signals 1062 is a clock signal and the load circuit 1009 comprises a data storage holding a time schedule indicating for each of a sequence of instants of time a corresponding change between operational modes. The load circuit 1009 is configured to change, at each of the instants of time, between the respective operational modes. The power supply circuit 1003 comprises a data storage storing a time schedule indicating, for each of the sequence of instants of time, a corresponding magnitude of the scheduled change of power consumption (e.g. a magnitude of a scheduled change of the load current) of the load circuit 1009 (e.g. a power or a current drawn at the output terminal 1050 by the load circuit 1009). According to these examples, the power supply circuit is configured to use the clock signal to infer from the time schedule an upcoming instant of time of the sequence of instants of time, and the power supply circuit is configured to adapt the control signal 312 so as to adapt, at the upcoming instant of time, the power level of the supplied power 1051 as indicated by the magnitude of the scheduled change of power consumption corresponding to the upcoming instant of time.

Similarly, according to examples, one of the timing signals 362 is a clock signal, and the power supply circuit 300 comprises a data storage storing a time schedule indicating for each of a sequence of instants of time a corresponding magnitude of a scheduled change of the load current. The power supply circuit 300 is configured to use the clock signal to infer from the time schedule an upcoming instant of time of the sequence of instants of time, and the power supply circuit 300 is configured to adapt the control signal 312 so as to adapt the power level of the supplied power 351 based on the magnitude of the scheduled change of power at the upcoming instant of time.

Similarly, according to examples, one of the timing signals 962 is a clock signal, and the load circuit 900 comprises a data storage storing a time schedule indicating, for each of a sequence of instants of time, a corresponding change between operational modes (e.g. on or off, or modes having different degrees of power consumption). The load circuit 900 is configured to change at each of the instants of time between the respective operational modes. The load circuit 900 is configured to provide, as one of the timing signals 962 and prior to starting an execution of the time schedule, a programming signal indicating a starting time, and to start the execution of the time schedule at the starting time.

The clock signal may be provided by the load circuit 1009 to the power supply circuit 1003. Alternatively, the clock signal may also be provided by the power supply circuit 1003 to the load circuit 1009.

The clock signal may be a digital signal, for example a digital binary signal.

For example, the clock signal allows for a synchronization of an execution of the time schedule for the operation of the load circuit 1009 stored in the power supply circuit 1003 and an execution of the time schedule for the operation of the load circuit 1009 stored in the load circuit 1009.

The power supply circuit 1003 may derive the indication 1064 by using the clock signal to evaluate the time schedule.

As the information about instants of time and magnitudes of scheduled changes of power consumption may be stored within the time schedule of the data storage of the power supply circuit 1003, the power supply circuit 1003 may be capable of adapting the control signal 312 fast. In some examples adapting the control signal 312 is achieved with a temporal resolution of the clock signal and at the same time individual magnitudes of the scheduled changes of power consumption may be realized. Thus, using the clock signal for deriving the indication 1064 may allow for an accurate realization of complex schedules for the power consumption.

In other words, a notification of scheduled load current steps or scheduled changes of power may be realized by a pre-programmed time-based schedule. For example, a synchronized clocking of the switching frequency of the DC/DC converter by the microcontroller may result in an absolute time precision needed to run a whole pre-programmed power supply sequence on a time schedule basis without external triggers.

According to examples, the load circuit 1009 is configured to provide, as one of the timing signals 1062 and prior to starting an execution of the time schedule, a programming signal indicating a starting time. The load circuit 1009 may start the execution of the time schedule at the starting time and the power supply circuit 1003 is configured to start an execution of the time schedule at the starting time indicated by the programming signal.

Similarly, according to examples, one of the timing signals 362 is a programming signal indicating a starting time for the time schedule, and the power supply circuit 300 is configured to start an execution of the time schedule at the starting time indicated by the programming signal.

According to examples, the one or more timing signals 1062 comprise one or more or all of the described examples for the timing signals 1062, i.e. the trigger signal, the information about the magnitude of the scheduled change of power consumption, and the clock signal. For example, for different types of scheduled changes of power consumption, different types of the described examples for the timing signals 1062 may be applied. For example, the load circuit 1009 may comprise one or more circuits each of which may be capable of operating according to a time schedule, wherein the power supply circuit 1003 may be synchronized with each of the circuits of the load circuit 1009 based on one or more of the timing signals 1062. In other examples the timing signals may include information other than the information described herein.

According to examples, the power supply circuit 1003 is a power management integrated circuit (PMIC), which may contain DC/DC converters and/or LDOs.

According to examples, the load circuit 1009 comprises a monolithic microwave integrated circuit (MMIC) and a microcontroller (MC).

Figure 11:
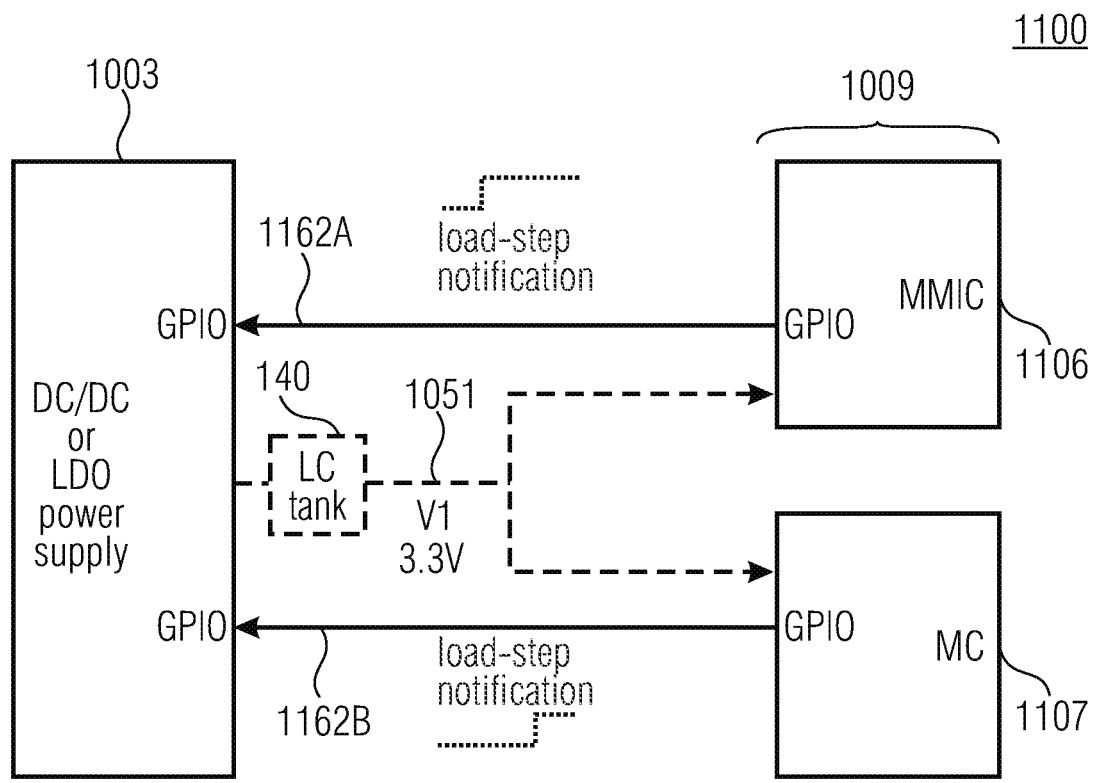
FIG. 11 illustrates another example of an electronic circuit according to the present disclosure.

FIG. 11 illustrates an example of an electronic circuit 1100. The electronic circuit 1100 may correspond to the electronic circuit 1000. The power supply circuit 1003 of the electronic circuit 1100 is a PMIC and the load circuit 1009 of the electronic circuit 1100 comprises a MMIC 1106 and a microcontroller 1107, both of which are supplied with power 1051 by the load circuit 1009. The MMIC 1106 is configured to indicate an upcoming scheduled change of power consumption using a first trigger signal 1162A, which may correspond to the trigger signal of the one or more timing signals 1062. The microcontroller 1107 is configured to indicate an upcoming scheduled change of power consumption using a second trigger signal 1162B, which may correspond to the trigger signal of the one or more timing signals 1062.

Figure 12:
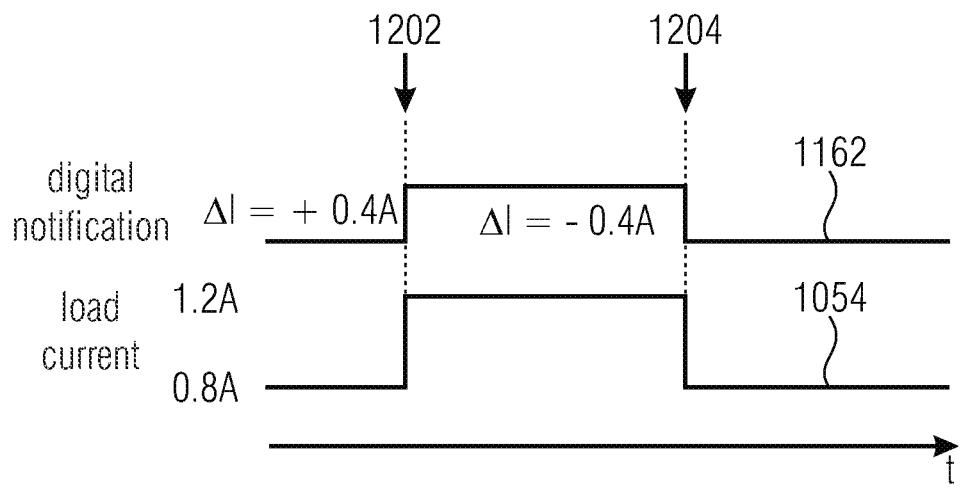
FIG. 12 shows an example of a trigger signal according to the present disclosure.

FIG. 12 shows a time-dependence of examples of a trigger signal 1162, which may correspond to one of the trigger signals 1162A, 1162B, and a corresponding load current 1054. In the shown example, a rising edge of the trigger signal 1162 at the time instant 1202 indicates a positive load current step and a falling edge of the trigger signal 1162 at the time instant 1204 indicates a negative load current step.

Figure 13:
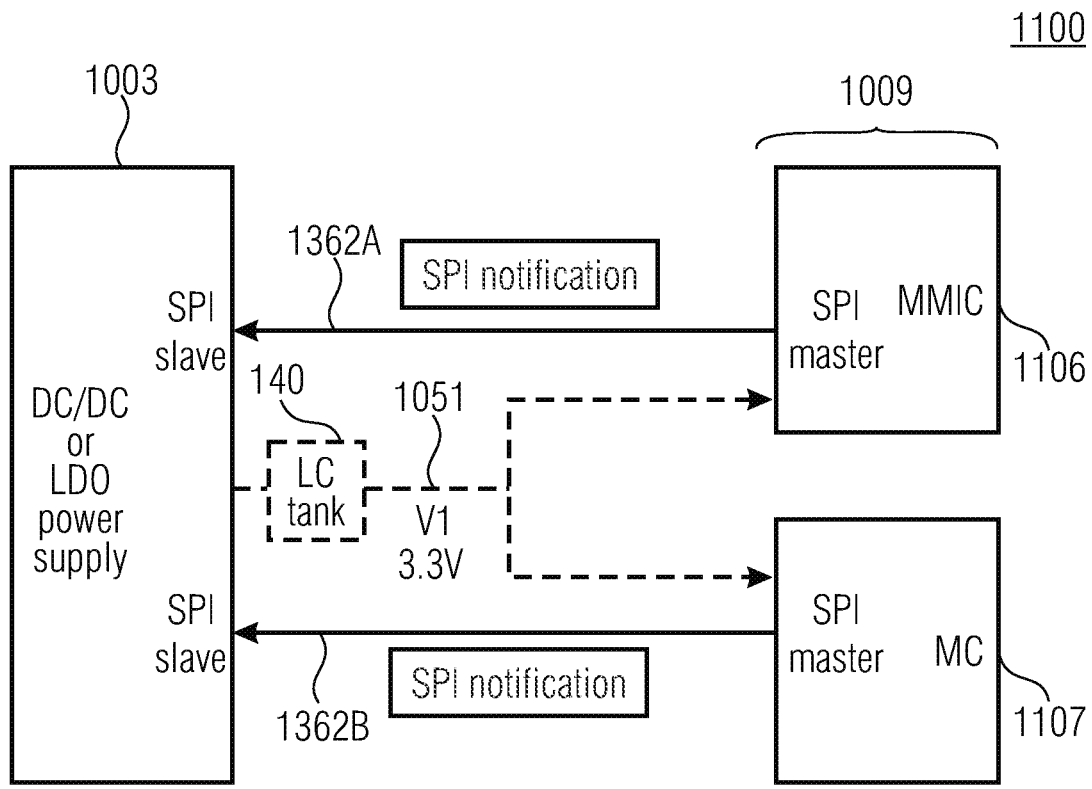
FIG. 13 illustrates another example of an electronic circuit according to the present disclosure.

FIG. 13 illustrates another example of the electronic circuit 1100, according to which the MMIC 1106 and the microcontroller are each configured to indicate an upcoming scheduled change of power consumption by a respective serial message 1362A and 1362B, which may be SPI notifications. The serial messages 1362A, B may each correspond to an information about the magnitude of the scheduled change of power consumption as described with respect to the timing signals 1062.

Figure 14:
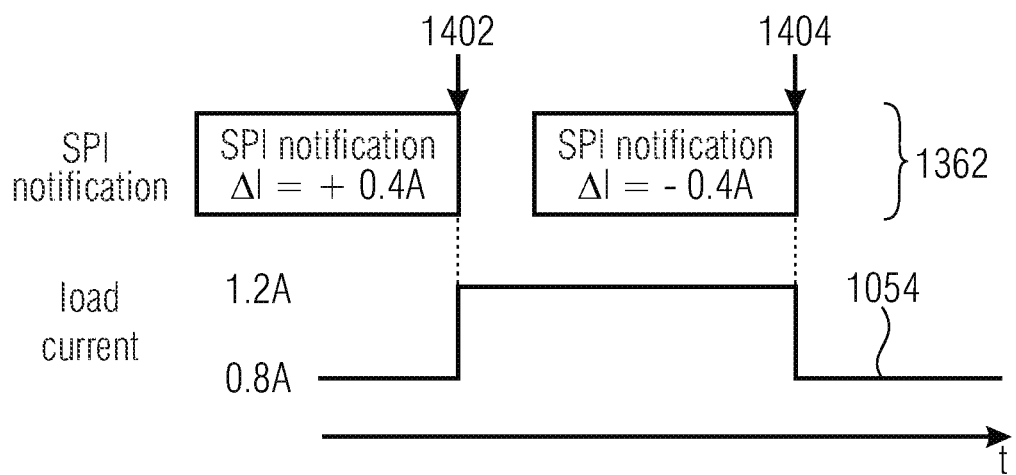
FIG. 14 shows a chronological sequence of examples of serial signals according to the present disclosure.

FIG. 14 shows a chronological sequence of examples of serial signals 1362, which may correspond to one of the serial signals 1362A, B, and a corresponding load current 1054. In the shown example, a serial message at the time instant 1402 indicates a positive load current step of 0.4 A and a serial message at the time instant 1404 indicates a negative load current step of −0.4 A.

Figure 15:
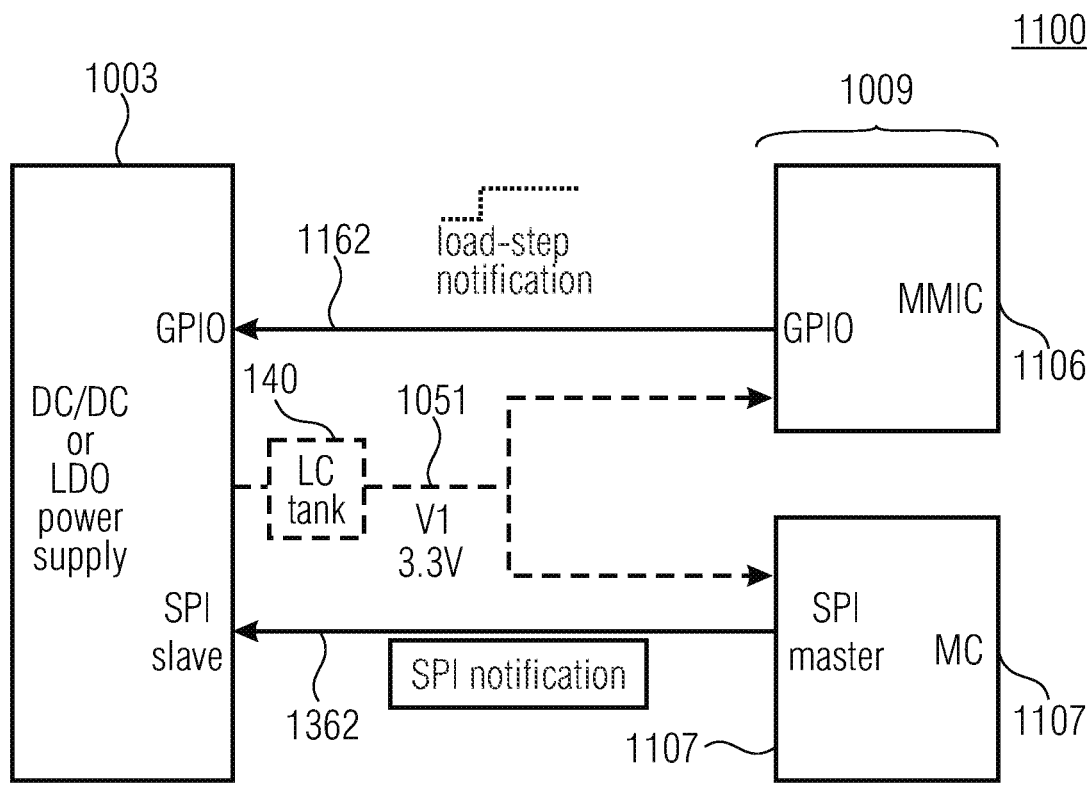
FIG. 15 illustrates another example of an electronic circuit according to the present disclosure.

FIG. 15 illustrates another example of the electronic circuit 1100, according to which the MMIC 1106 is configured to indicate an upcoming scheduled change of power consumption by the trigger signal 1162, and the microcontroller 1107 is configured to indicate an upcoming scheduled change of power consumption by a serial message 1362, which may correspond to the serial message 1362B.

In other words, for example, if the MMIC 1106 does not have an SPI or serial interface master, it may send its notifications per digital line, marking the time instant of the load current step. The microcontroller 1107 may have the knowledge of the current profile of the whole system and preconfigures the power supply per serial interface regarding the size of the next load current step.

Figure 16:
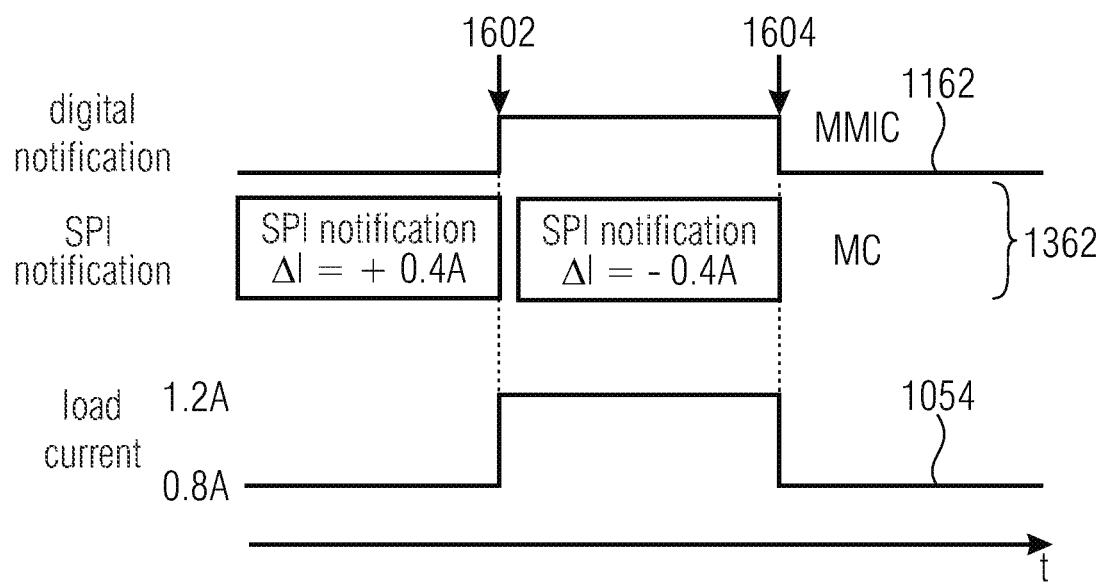
FIG. 16 shows a chronological sequence of examples of the trigger signal and the serial signal according to the present disclosure.

FIG. 16 shows a chronological sequence of examples of the trigger signal 1162 and the serial signal 1362. In the shown example, at each of the time instants 1602 and 1604, both, the trigger signal 1162 and a serial message of the serial signal 1362 indicate a scheduled change of the load current 1054.

Figure 17:
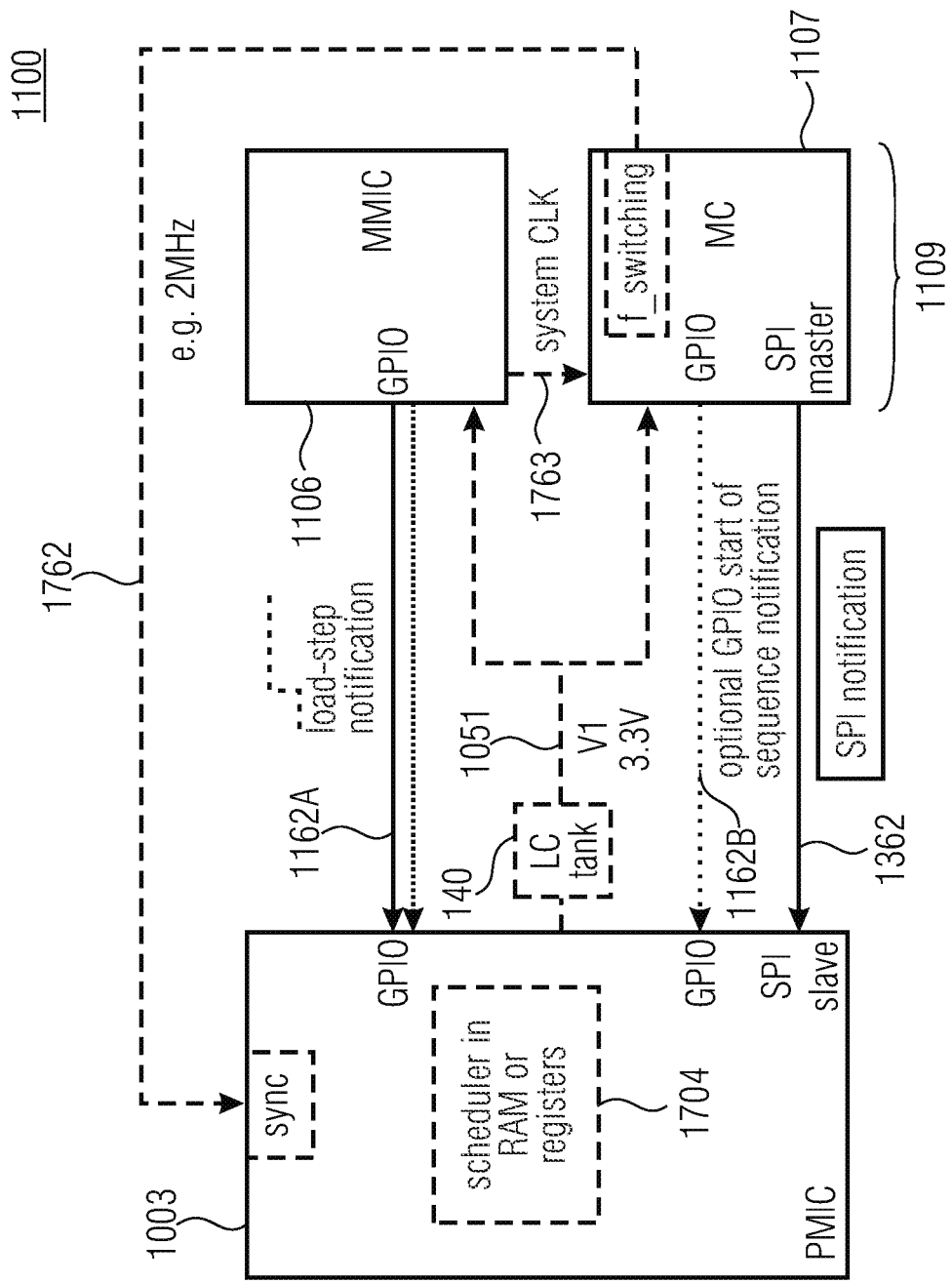
FIG. 17 illustrates another example of an electronic circuit according to the present disclosure.

FIG. 17 illustrates another example of the electronic circuit 1100, according to which the microcontroller 1107 provides a clock signal 1762 to the power supply circuit 1003. The clock signal 1762 may correspond to the clock signal as described with respect to the timing signals 1062. Additionally, the microcontroller 1107 may also provide the serial message 1362 and/or the trigger signal 1162B to the power supply circuit 1003. The MMIC 1106 may provide the trigger signal 1162A to the power supply circuit 1003. For example, the MMIC 1106 may provide a system clock to the microcontroller 1107 and the microcontroller 1107 may provide the clock signal 1762 based on the system clock. The power supply circuit 1003 may include a data storage 1704, for example RAM or registers. The data storage 1704 may include a scheduler configured to provide the indication 1064 based on the clock signal 1762, as described with respect to the clock signal before.

In other words, an additional option is to supply the switching clock reference frequency, e.g. the clock signal 1762, by the microcontroller. In this case the whole system may share a common time basis. The power supply profile or a part of the power supply profile with all the load steps can be preprogrammed/loaded to PMIC to RAM or registers. The PMIC can execute a predefined load sequence, optionally combining the notifications over SPI or digital lines.

It is to be noted, that the principle of notifications described with respect to FIGS. 11 to 17 for the electronic circuit 1100 may be extended to a complex system of multiple PMICs, MMICs and MCs.

Figure 18:
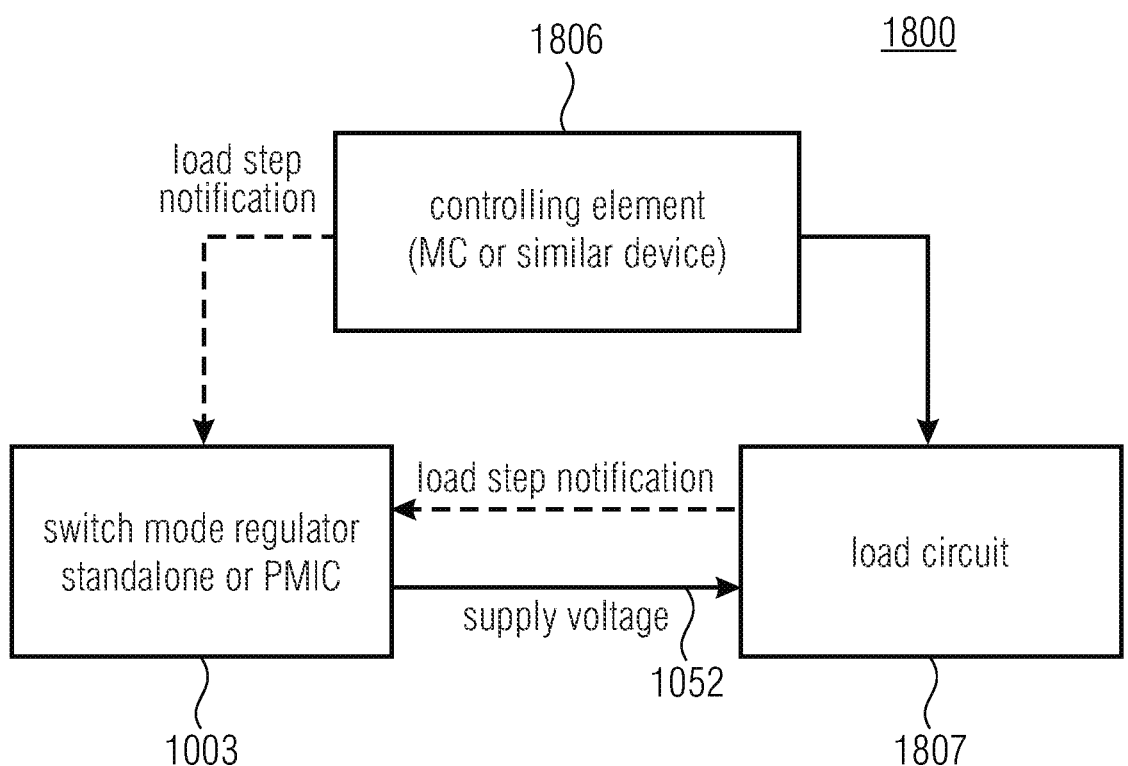
FIG. 18 illustrates another example of an electronic circuit according to the present disclosure.

FIG. 18 illustrates an example of an electronic circuit 1800, which may correspond to the electronic circuit 1000. The electronic circuit 1800 comprises the power supply circuit 1003, which may be implemented as a switch mode regulator standalone or a PMIC. Electronic circuit 1800 further comprises a load circuit 1807 which is supplied with a supply voltage 1052 by the power supply circuit 1003. The load circuit 1807 is configured to provide a load step notification about a scheduled change of a load current to the power supply circuit 1003. The electronic circuit 1800 further comprises a controlling element 1806, for example a microcontroller or a similar device. The controlling element 1806 may provide a load step notification about a scheduled change of a load current to the power supply circuit 1003. Further, the controlling element 1806 may control the load circuit 1807. The controlling element 1806 may control the load circuit 1807 to be in an operational mode which may have a specific power consumption or which may require a specific load current.

According to examples, the load circuit 1009 comprises a radar transceiver circuit and a microcontroller circuit, each configured to operate in respective predetermined operational modes during respective scheduled periods of time. Each of the predetermined operational modes is attributed with a predetermined power consumption (e.g. a predetermined load current at a predetermined value of a supply voltage of the supplied power). The electronic circuit 1000 is configured to consider a scheduled change between respective predetermined operational modes of the respective circuit at an upcoming instant of time. Accordingly, the MMIC 1106 of the electronic circuit 1100 shown in FIG. 17 may be a radar transceiver.

For example, radar systems go through a deterministic sequence of states with well-defined load current steps, both in time and size. The load current step sizes have some chip to chip variation. The current profile during normal operation is deterministic.

Figure 19:
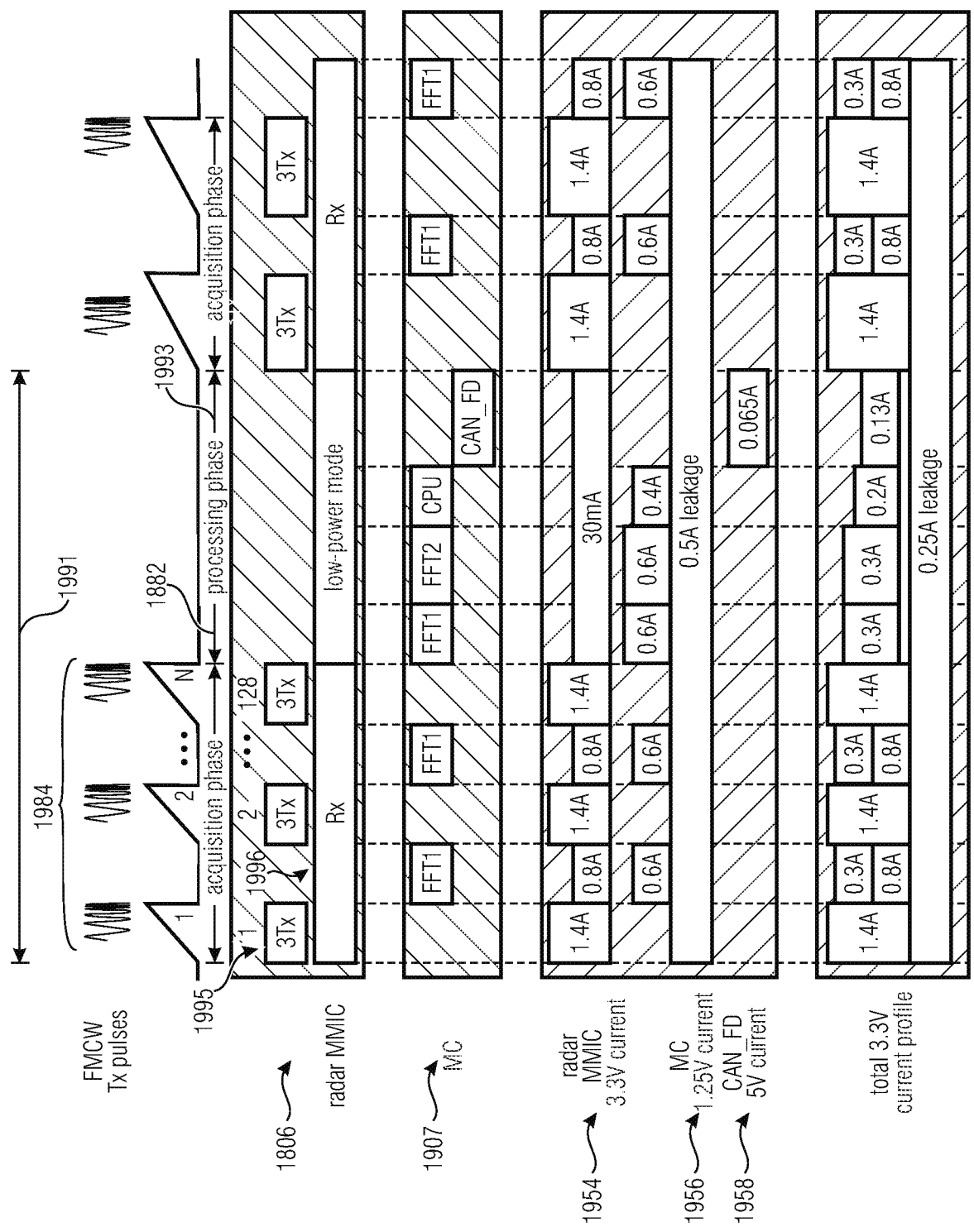
FIG. 19 shows an example of a chronological sequence of operational modes of a radar system according to the present disclosure.

FIG. 19 shows an example of a chronological sequence of operational modes of a radar transceiver and a microcontroller circuit according to the present disclosure. The chronological sequence of the operation of the radar transceiver and the microcontroller circuit comprise a cycle 1991, which may be repeatedly executed. The cycle 1991 comprises an acquisition phase 1992 and a processing phase 1993. During the processing phase 1993, the radar transceiver 1806 may operate in a low-power mode. During the acquisition phase 1992, the radar transmitter may transmit a sequence of pulses (e.g. FMCW chirps) 1994. Each of the pulses are transmitted during a transmission time 1995 and are followed by a receiving time 1996 during which the power consumption may be lower than during the transmission time. Thus, each change between a transmission time and a receiving time as well as each change between the acquisition phase and the processing phase may be associated with the change of power consumption of the radar transmitter. Additionally, the microcontroller may be configured to acquire data during the receiving time, so that a power consumption of the microcontroller may be higher during the receiving time than during the transmission time. The chronological sequence of FIG. 19 shows a current consumption 1906 of the radar transmitter, a current consumption 1907 of the microcontroller, a current 1954 of the radar transmitter, a current 1956 of the microcontroller, a current 1958 of a communication module or a bus, which may be part of the load circuit 1009, and an example for a total current consumption of the load circuit 1009.

Figure 20:
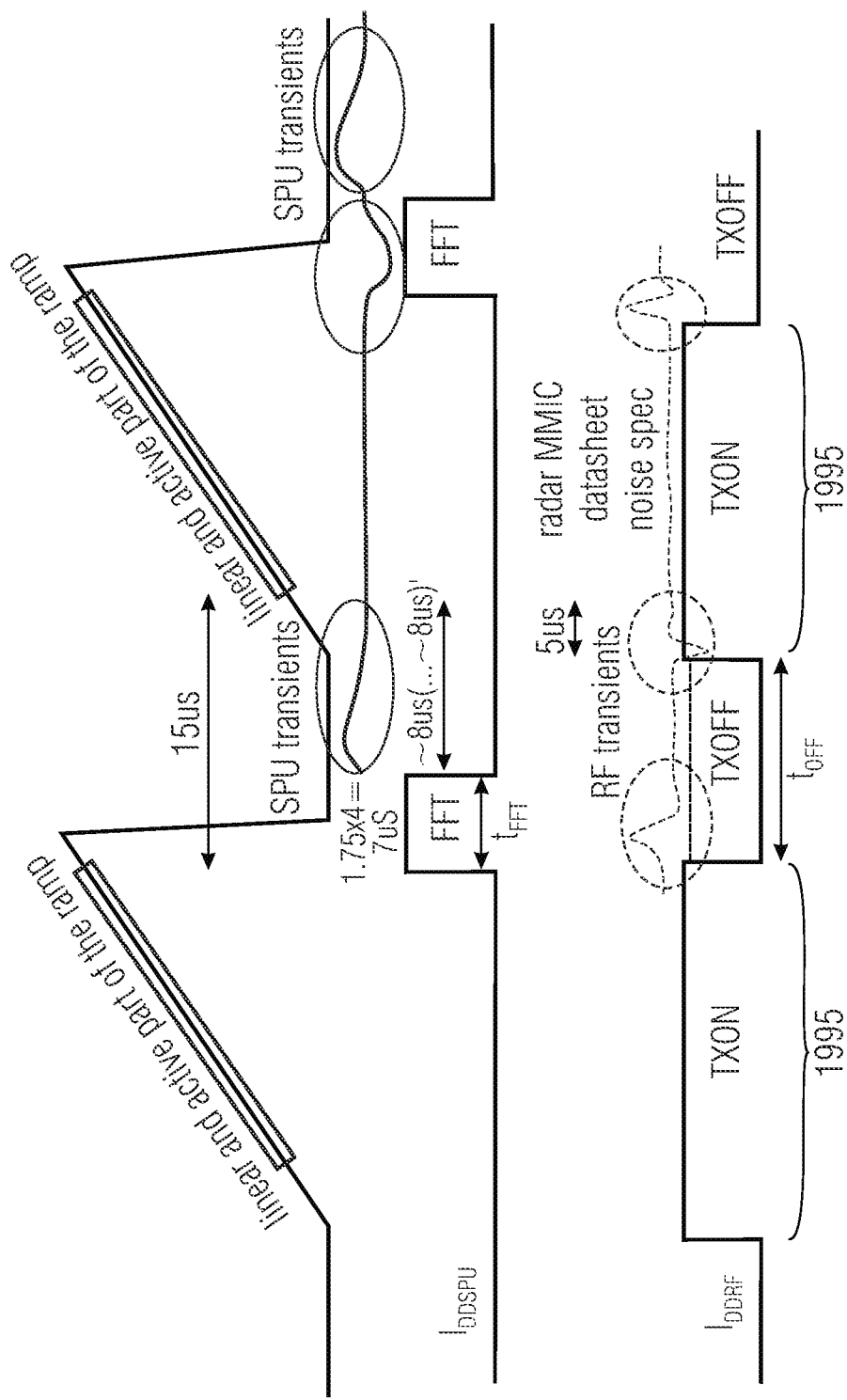
FIG. 20 shows a detailed diagram of an example of the chronological sequence of the radar system according to the present disclosure.

FIG. 20 shows a detailed diagram of the chronological sequence of FIG. 19. The scheduled changes of power consumption may occur in temporal distances in the regime of microseconds or tens of microseconds. The disclosed concept allows for adapting the control signal 312 and subsequently also the load current provided to the load circuit 1009, within this timescale. Transients, for example SPU transients or RF transients supply voltage are avoided or decreased with the described concept.

In more detail, load current steps may cause a transient response of the power supply. Consequently, the supply voltage may drop down or rise up for about 20-30 µs for example. The load current steps can cause undervoltages and overvoltages. The radar system needs to wait until the transients have settled in order to continue to operate with stable steady supply voltage. If the PMIC is informed upfront of an imminent load current step, the PMIC is allowed to adjust immediately and directly its output current, thereby bypassing the control loop. The residual settling time is shortened and residual under/overvoltages are smaller compared to conventional power control systems. The control loop 325 may take care only of load current steps size differences which may arise from chip-to-chip differences, which may arise from manufacturing differences. That is, the approximate extent of a load current step may be known for a scheduled operation of a specific device, so that the PMIC 1003 may be informed about the upcoming load current step of the known size. A deviation of the load current from the scheduled value, e.g. due to said chip-to-chip differences, may be regulated by the control loop 325.

The radar chip and the microcontroller may send notifications to the power supply chip 1003 of the immediately upcoming load step. A notification to the power supply circuit 1003 may be realized by the timing signals 1062.

Figure 21:
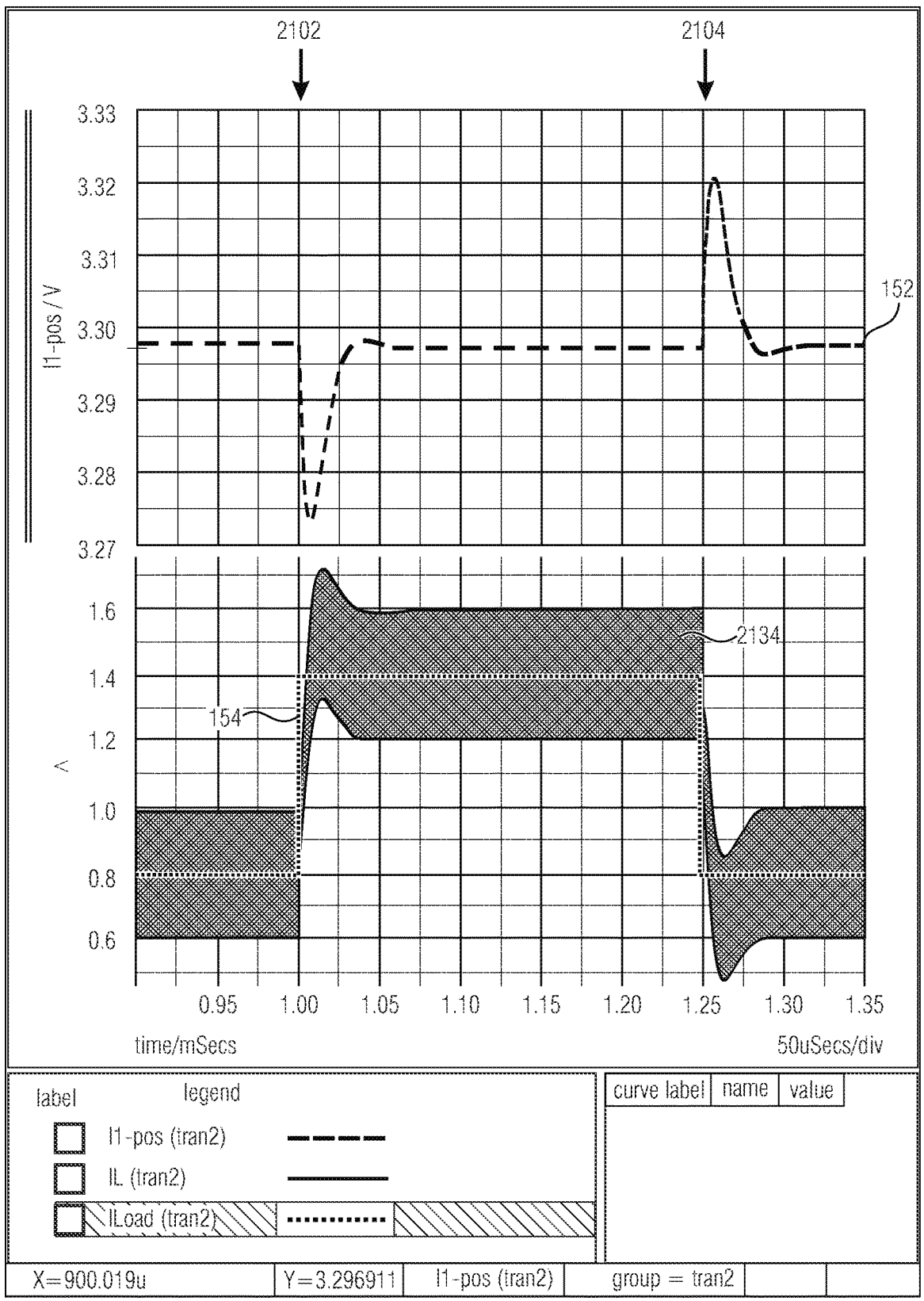
FIG. 21 shows an example of a temporal behavior of a conventional buck regulator at load current steps.

FIG. 21 shows a diagram illustrating a time dependence of the output voltage 152 and the load current 154 at the output terminal 150 and a time dependence of the current 2134 at the output of the control circuit 132 of the conventional buck regulator 100 for a first and a second load step 2102 and 2104.

Figure 22:
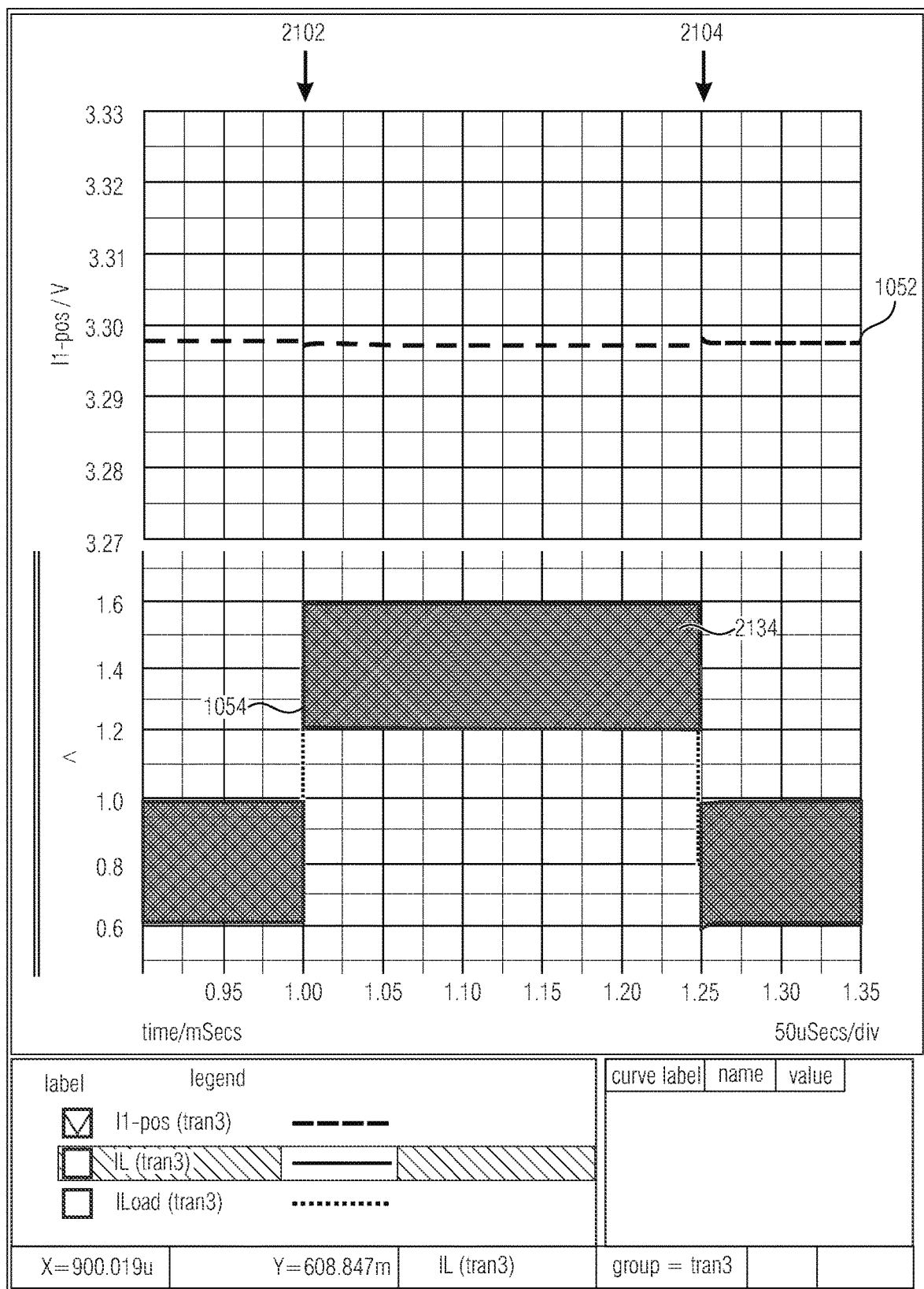
FIG. 22 shows an example of a temporal behavior of the power supply circuit according to the present disclosure at load current steps.

FIG. 22 shows a diagram illustrating a time-dependence the output voltage 1052 and the load current 1054 at the output terminal 1050 and the current 2234 at the output 330 of the control circuit 325 of the electronic circuit 1000 according to the present disclosure for the first and the second load steps 2102 and 2104.

Figure 23:
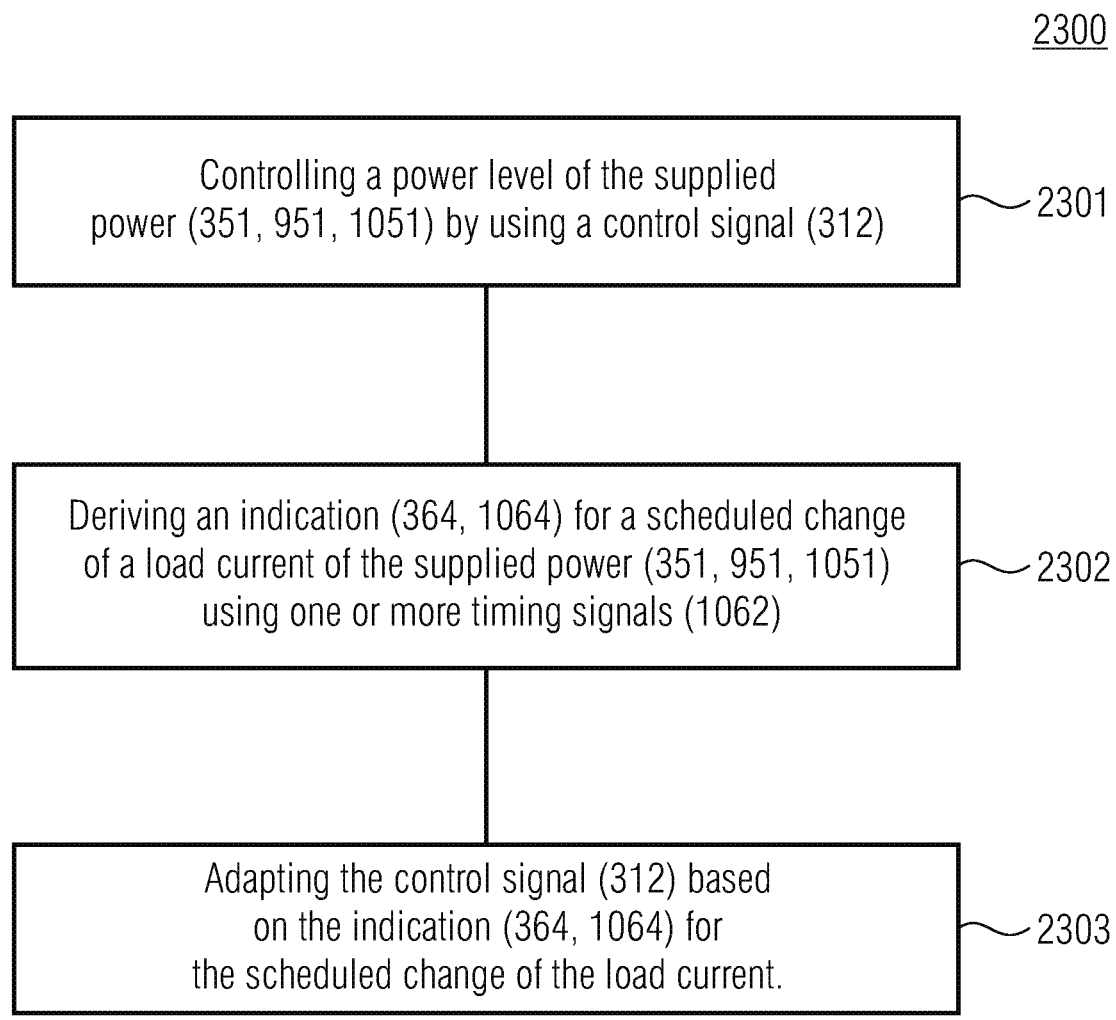
FIG. 23 shows a flowchart of a method for supplying power to a semiconductor device according to the present disclosure.

FIG. 23 shows a flowchart of an example of a method 2300 for supplying power 351, 951, 1051 to a semiconductor device 900, 1009 according to the present disclosure. The method 2300 comprises at step 2401 controlling a power level of the supplied power 351, 951, 1051 by using a control signal 312, at step 2402 deriving of an indication 364, 1064 for a scheduled change of a load current of the supplied power 351, 951, 1051 using one or more timing signals 1062, and at step 2403 adapting of the control signal 312 based on the indication 364, 1064 for the scheduled change of the load current.

Figure 24:
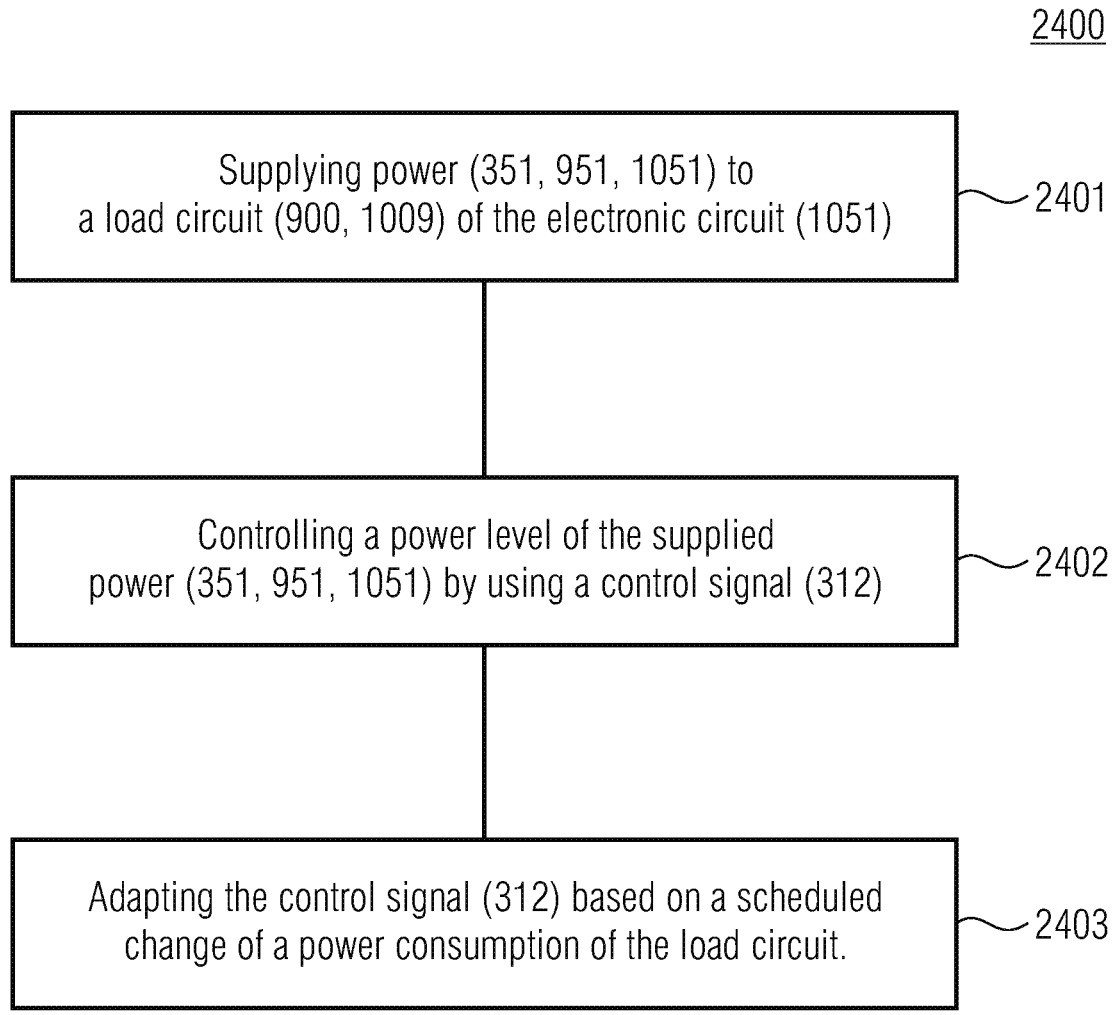
FIG. 24 shows a flowchart of a method for operating an electronic circuit according to the present disclosure.

FIG. 24 shows a flowchart of an example of a method 2400 for operating an electronic circuit 1051 according to the present disclosure. The method 2400 comprises at step 2401 of supplying power 351, 951, 1051 to a load circuit 900, 1009 of the electronic circuit 1051, a step 2402 of controlling a power level of the supplied power 351, 951, 1051 by using a control signal 312, and a step 2403 of adapting the control signal 312 based on a scheduled change of a power consumption of the load circuit.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

What is claimed is:

1. A power supply circuit, comprising:
   an output terminal configured to supply power for a semiconductor device at the output terminal;
   a control circuit configured to control a power level of the supplied power based on a control signal; and
   an input configured to receive one or more timing signals,
      wherein the power supply circuit is configured to derive an indication for a scheduled change of a load current of the supplied power using the one or more timing signals,
      wherein the control circuit is configured to adapt the control signal based on the indication for the scheduled change of the load current,
      wherein the power supply circuit is further configured to infer from the one or more timing signals that the scheduled change of the load current is upcoming at an upcoming instant of time,
      wherein the power supply circuit is configured to adapt the control signal at the upcoming instant of time based on the scheduled change of the load current,
      wherein the control signal is a current signal,
      wherein the power supply circuit further comprises a controlled current source, an output of which is connected to a signal path of the control signal, and
      wherein the control circuit is configured to adapt the control signal by controlling an output current of the controlled current source.

2. The power supply circuit according to claim 1, wherein the control circuit comprises a feedback loop configured to control the power level of the supplied power based on the control signal, wherein the control signal depends on the supplied power.

3. The power supply circuit according to claim 1, further comprising:
   an error amplifier configured to provide the control signal dependent on a deviation of a supply voltage of the supplied power from a predetermined supply voltage value.

4. The power supply circuit according to claim 1,
   wherein the control circuit is configured to obtain a current feedback signal indicating a magnitude of the load current,
   wherein the control circuit comprises a comparator configured to compare the control signal to the current feedback signal to generate a modulation signal based on an output signal of the comparator, and
   wherein the control circuit is configured to control the magnitude of the load current using the modulation signal.

5. The power supply circuit according to claim 1, wherein at least one of the one or more timing signals comprises a trigger signal indicating that the scheduled change of the load current is upcoming, and
   wherein the control circuit is configured to, in response to receiving the trigger signal, adapt the control signal by a predetermined magnitude that is attributed to the trigger signal.

6. A power supply circuit, comprising:
   an output terminal configured to supply power for a semiconductor device at the output terminal;
   a control circuit configured to control a power level of the supplied power based on a control signal; and
   an input configured to receive one or more timing signals,
      wherein the power supply circuit is configured to derive an indication for a scheduled change of a load current of the supplied power using the one or more timing signals,
      wherein the control circuit is configured to adapt the control signal based on the indication for the scheduled change of the load current,
      wherein the power supply circuit is further configured to infer from the one or more timing signals that the scheduled change of the load current is upcoming at an upcoming instant of time,
      wherein the power supply circuit is configured to adapt the control signal at the upcoming instant of time based on the scheduled change of the load current,
      wherein at least one of the one or more timing signals comprises information about a magnitude of the scheduled change of the load current at the upcoming instant of time, and
      wherein the control circuit is configured to, in response to receiving the information about the magnitude of the scheduled change of the load current, adapt the control signal based on the magnitude of the scheduled change of the load current.

7. A power supply circuit, comprising:
an output terminal configured to supply power for a semiconductor device at the output terminal;
a control circuit configured to control a power level of the supplied power based on a control signal; and
an input configured to receive one or more timing signals, wherein the power supply circuit is configured to derive an indication for a scheduled change of a load current of the supplied power using the one or more timing signals,
wherein the control circuit is configured to adapt the control signal based on the indication for the scheduled change of the load current,
wherein the power supply circuit is further configured to infer from the one or more timing signals that the scheduled change of the load current is upcoming at an upcoming instant of time,
wherein the power supply circuit is configured to adapt the control signal at the upcoming instant of time based on the scheduled change of the load current,
wherein one of the one or more timing signals is a clock signal,
wherein the power supply circuit comprises a data storage that stores a time schedule indicating, for each of a sequence of instants of time, a corresponding magnitude of the scheduled change of the load current,
wherein the power supply circuit is configured to use the clock signal to infer from the time schedule the upcoming instant of time of the sequence of instants of time, and
wherein the control circuit is configured to adapt the control signal so as to adapt the power level of the supplied power based on the corresponding magnitude of the scheduled change of power at the upcoming instant of time.

8. The power supply circuit according to claim 7, wherein one of the one or more timing signals is a programming signal indicating a starting time for the time schedule, and
wherein the power supply circuit is configured to start an execution of the time schedule at the starting time indicated by the programming signal.

9. A load circuit, comprising:
a power input terminal configured to receive a supply power; and
one or more signal output terminals, wherein the load circuit is configured to provide one or more timing signals at the one or more signal output terminals, wherein the one or more timing signals indicate that a scheduled change of power consumption of the supply power is upcoming at an upcoming instant of time,
wherein the load circuit is configured to provide, in anticipation of a scheduled change of power consumption of the load circuit at the upcoming instant of time, a trigger signal indicating that the scheduled change of power consumption is upcoming at the upcoming instant of time, wherein the trigger signal is specific to a type of the scheduled change of power consumption, and wherein the load circuit is configured to provide the trigger signal as one of the one or more timing signals.

10. The load circuit according to claim 9, wherein the one or more timing signals indicate the scheduled change of power consumption by indicating a scheduled change of a load current of the supply power consumed by the load circuit.

11. The load circuit according to claim 9, wherein the load circuit is configured to:
provide, in anticipation of a scheduled change of operation of the load circuit at the upcoming instant of time, an information signal indicating a magnitude of the scheduled change of power consumption of the supply power attributed to the scheduled change of power consumption, and wherein the load circuit is configured to provide the information signal as one of the one or more timing signals.

12. The load circuit according to claim 9, wherein one of the one or more timing signals is a clock signal,
wherein the load circuit comprises a data storage configured to store a time schedule indicating, for each of a sequence of instants of time, a corresponding change between operational modes, wherein the load circuit is configured to change, at each of the instants of time, between respective operational modes of the load circuit, and
wherein the load circuit is configured to provide, as one of the one or more timing signals and prior to starting an execution of the time schedule, a programming signal indicating a starting time, and start the execution of the time schedule at the starting time.

13. An electronic circuit, comprising:
a load circuit; and
a power supply circuit connected to the load circuit for supplying power to the load circuit, wherein the power supply circuit comprises a control circuit configured to control a power level of the supplied power based on a control signal,
wherein the power supply circuit and the load circuit are connected via one or more signal paths configured for one or more timing signals,
wherein the power supply circuit is configured to derive an indication for a scheduled change of power consumption of the supplied power using the one or more timing signals,
wherein the power supply circuit is further configured to infer from the one or more timing signals that the scheduled change of power consumption is upcoming at an upcoming instant of time,
wherein the control circuit is configured to adapt the control signal based on the indication for the scheduled change of power consumption, including adapting the control signal at the upcoming instant of time based on the scheduled change of power consumption,.
wherein one of the one or more timing signals is a clock signal,
wherein the load circuit comprises a data storage configured to store a time schedule indicating, for each of a sequence of instants of time, a corresponding change between operational modes, wherein the load circuit is configured to change, at each of the instants of time, between respective operational modes,
wherein the power supply circuit comprises a data storage configured to store a time schedule indicating, for each of the sequence of instants of time, a corresponding magnitude of the scheduled change of power consumption of the load circuit, wherein the power supply circuit is configured to use the clock signal to infer from the time schedule an upcoming instant of time for each of the sequence of instants of time, and wherein the control circuit is configured to adapt the control signal so as to adapt, at each upcoming instant of time, the power level of the supplied power as indicated by the corresponding magnitude of the scheduled change of power consumption corresponding to a respective upcoming instant of time for one of the sequence of instants of time.

14. The electronic circuit according to claim 13, wherein the control circuit is configured to control the power level of the supplied power by controlling a load current of the supplied power, and wherein the power supply circuit is configured to derive the indication for the scheduled change of power consumption by deriving an indication for a scheduled change of the load current using the one or more timing signals.

15. The electronic circuit according to claim 13, wherein the load circuit is configured to provide, in anticipation of a scheduled change of operation of the load circuit at the upcoming instant of time, an information signal that indicates a magnitude of the scheduled change of power consumption of the supplied power attributed to the scheduled change of operation, and wherein the load circuit is configured to provide the information signal as one of the one or more timing signals, and wherein the control circuit is configured to:
  receive the information signal about the magnitude of the scheduled change of power consumption, and
  adapt the control signal based on the magnitude of the scheduled change of power consumption.

16. The electronic circuit according to claim 13, wherein the load circuit is configured to provide, in anticipation of a scheduled change of operation of the load circuit at the upcoming instant of time, a trigger signal that indicates that the scheduled change of operation is upcoming, wherein the trigger signal is specific to a type of the scheduled change of power consumption, and wherein the load circuit is configured to provide the trigger signal as one of the one or more timing signals, and wherein the control circuit is configured to, in response to receiving the trigger signal, adapt the control signal by a predetermined magnitude that is attributed to the trigger signal.

17. The electronic circuit according to claim 13, wherein the load circuit is configured to provide, as one of the one or more timing signals and prior to starting an execution of the time schedule, a programming signal indicating a starting time, and start the execution of the time schedule at the starting time, and wherein the power supply circuit is configured to start an execution of the time schedule at the starting time indicated by the programming signal.

18. The electronic circuit according to claim 13, wherein the load circuit comprises a radar transceiver circuit and a microcontroller circuit, each configured to operate in respective predetermined operational modes during respective scheduled periods of time, wherein each of the respective predetermined operational modes is attributed with a predetermined power consumption, and wherein the electronic circuit is configured to consider, for the scheduled change of power consumption of the load circuit for the upcoming instant of time, for one or both of the radar transceiver circuit and the microcontroller circuit, a scheduled change between two of the respective predetermined operational modes at the upcoming instant of time.

19. A method for supplying power to a semiconductor device, the method comprising:

controlling a power level of the supplied power by using a control signal;

deriving an indication for a scheduled change of a load current of the supplied power using one or more timing signals, including inferring from the one or more timing signals that the scheduled change of the load current is upcoming at an upcoming instant of time; and adapting the control signal based on the indication for the scheduled change of the load current, including adapting the control signal at the upcoming instant of time based on the scheduled change of the load current, wherein the control signal is a current signal, and wherein adapting the control signal includes controlling an output current of a controlled current source, an output of which is connected to a signal path of the control signal.

20. A method for operating an electronic circuit, comprising:

supplying power to a load circuit of the electronic circuit;

controlling a power level of the supplied power by using a control signal;

deriving an indication for a scheduled change of power consumption of the supplied power using one or more timing signals, including inferring from the one or more timing signals that the scheduled change of power consumption of the load circuit is upcoming at an upcoming instant of time; and adapting the control signal based on the scheduled change of power consumption of the load circuit, including adapting the control signal at the upcoming instant of time based on the scheduled change of power consumption of the load circuit, wherein the control signal is a current signal, and wherein adapting the control signal includes controlling an output current of a controlled current source, an output of which is connected to a signal path of the control signal.

* * * * *